FIG. 2C.

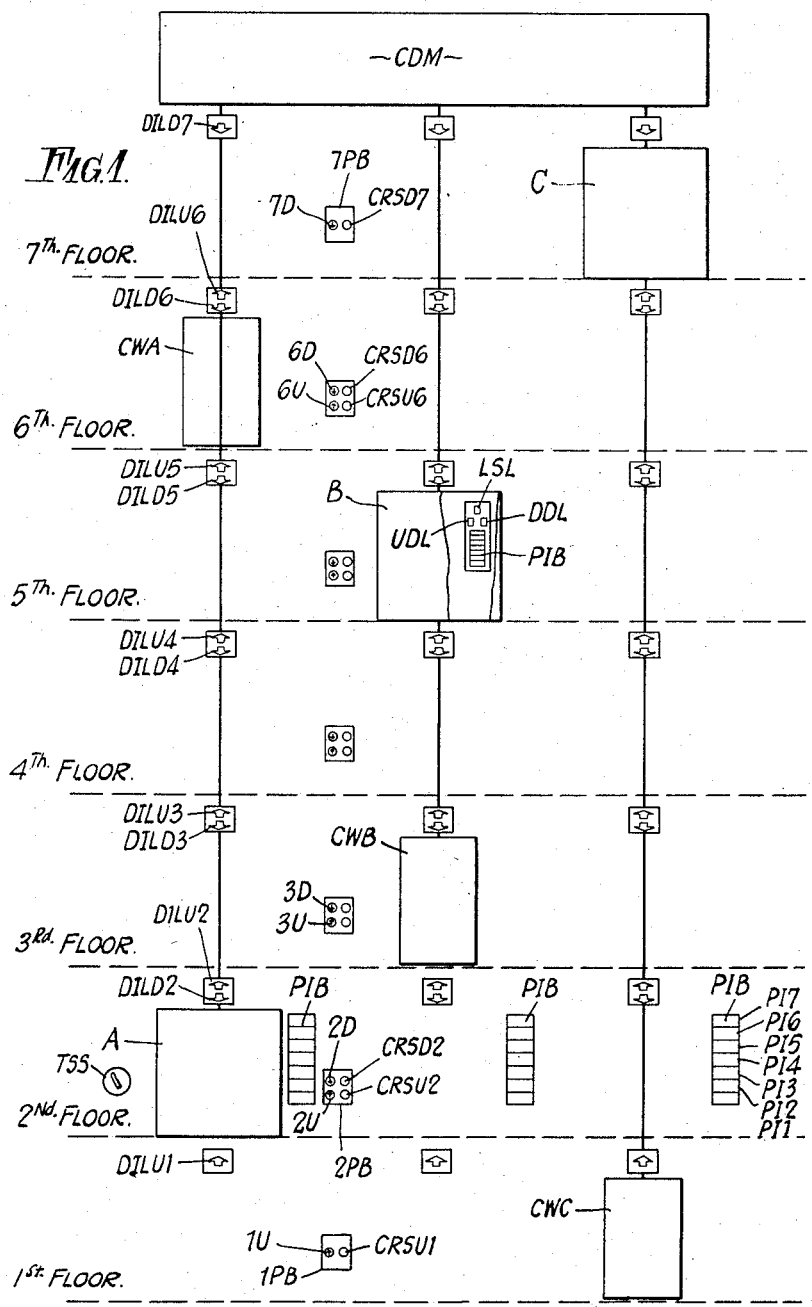

Aug. 12, 1958 W. J. BAILEY 2,847,090
LIFT CONTROL SYSTEMS
Filed Feb. 19, 1957 27 Sheets-Sheet 7

FIG.14

Aug. 12, 1958     W. J. BAILEY     2,847,090
LIFT CONTROL SYSTEMS
Filed Feb. 19, 1957     27 Sheets-Sheet 14

FIG.15

Aug. 12, 1958  W. J. BAILEY  2,847,090
LIFT CONTROL SYSTEMS
Filed Feb. 19, 1957  27 Sheets-Sheet 15

FIG.16

FIG.19

Figure 20:
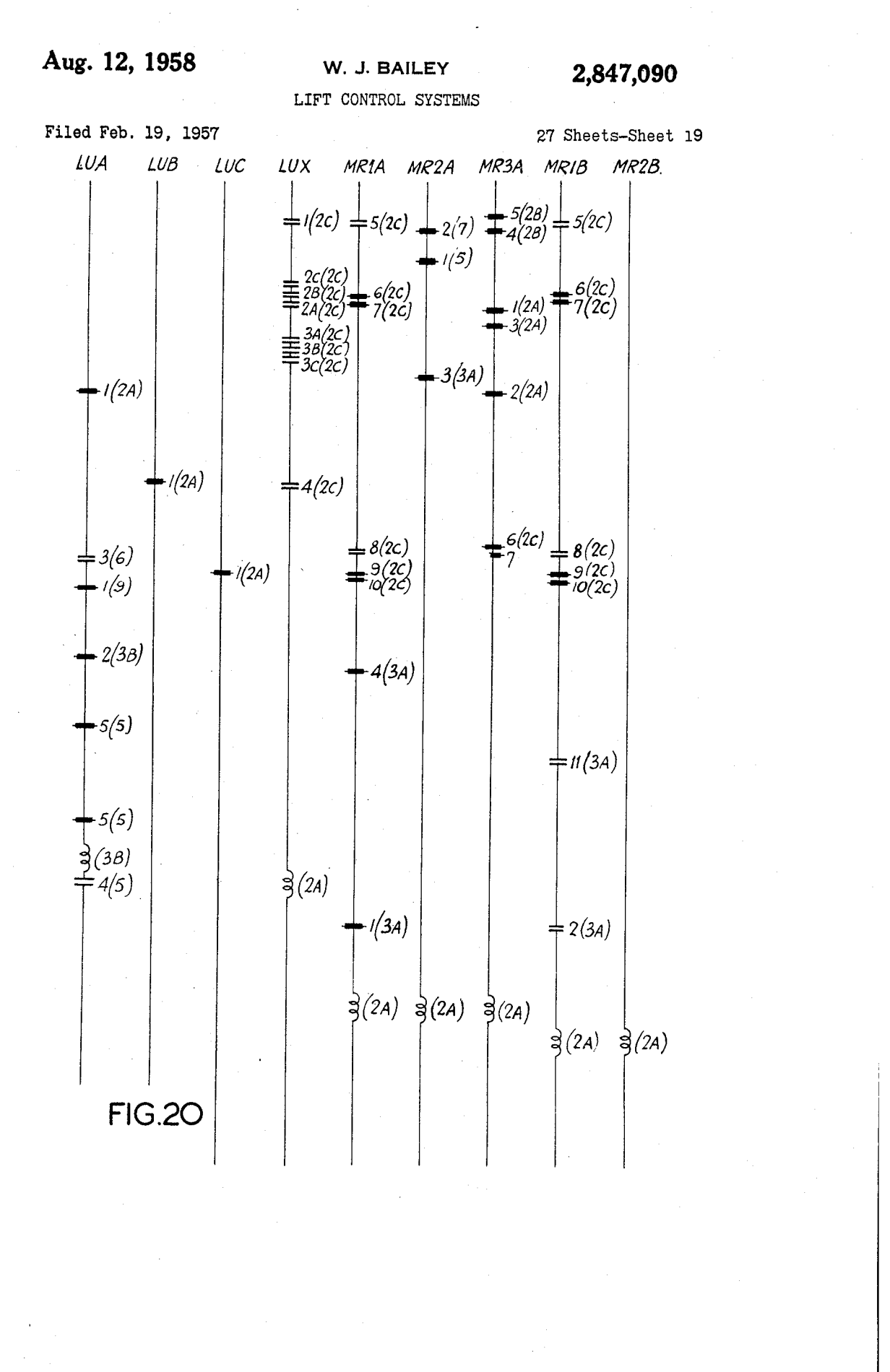

Aug. 12, 1958     W. J. BAILEY     2,847,090
LIFT CONTROL SYSTEMS

Filed Feb. 19, 1957     27 Sheets-Sheet 19

United States Patent Office 2,847,090
Patented Aug. 12, 1958

2,847,090

LIFT CONTROL SYSTEMS

William John Bailey, Bexley, England, assignor to J. and E. Hall Limited, London, England, a British company Application February 19, 1957, Serial No. 641,184

Claims priority, application Great Britain February 23, 1956

42 Claims. (Cl. 187—29)

This invention relates to lift systems of the kind in which a plurality of cars serve a number of floors or landings. The cars are arranged so that in most cases upon the completion of a trip each car returns to a particular floor. This floor is termed the despatching floor. Movement of each car is initiated either by a car call which is made by a person in the car and who desires to travel to a certain floor, or by a landing call that is initiated by a passenger waiting at one floor and who desires to travel to another floor. Landing calls are supervised by a despatch signal initiating system to determine whether a landing call can conveniently be attended to by a car already on a trip or whether a further car that is waiting at the despatching floor should be given a despatch signal to initiate despatch of this car to attend to the landing call.

According to the present invention there is provided a lift system of the kind referred to, wherein the despatch signal initiating system comprises means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device of the first selected car when the despatch interval has expired and there is an outstanding landing call that requires despatch of a car, and means for transferring starting preference from the first selected car to the next selected car at the despatching floor when the despatch signal device of the first selected car is operated.

Figure 2A:
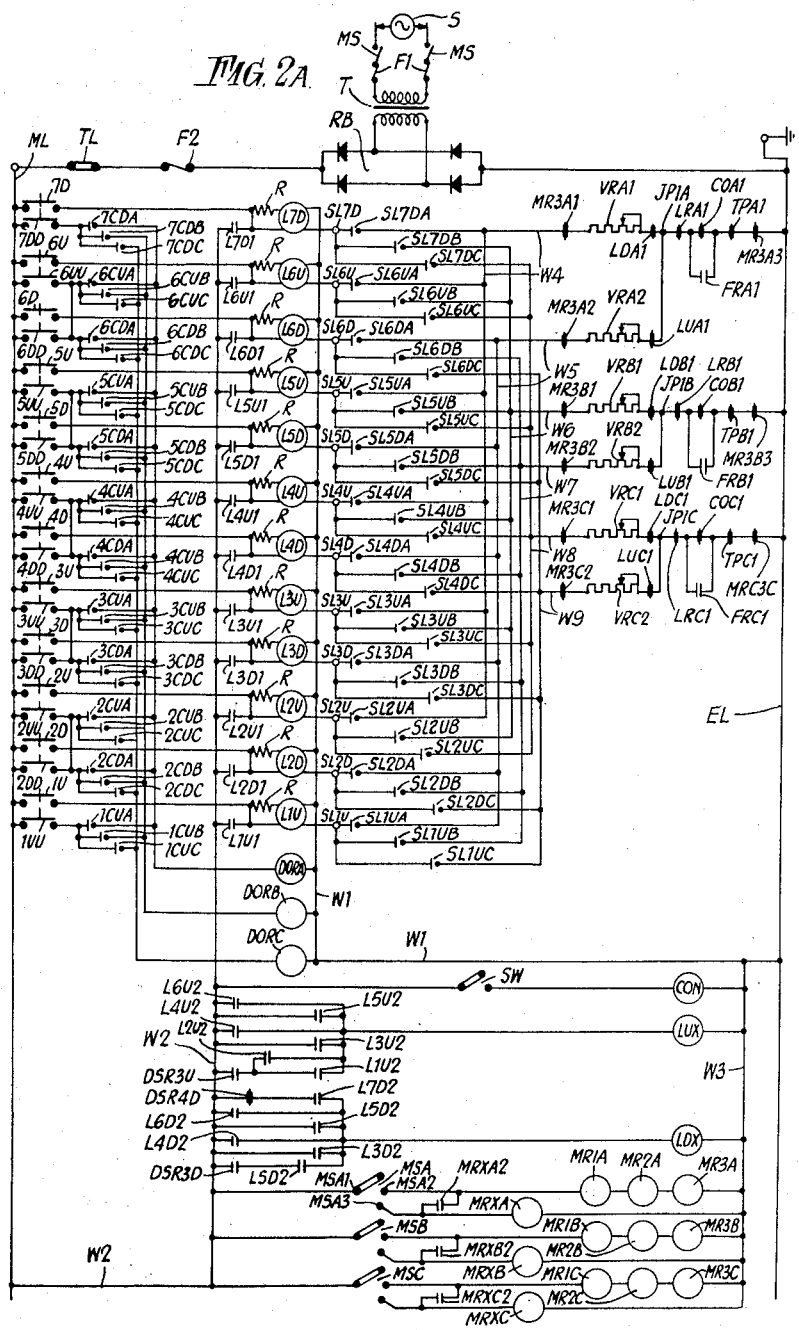
Figure 2B:
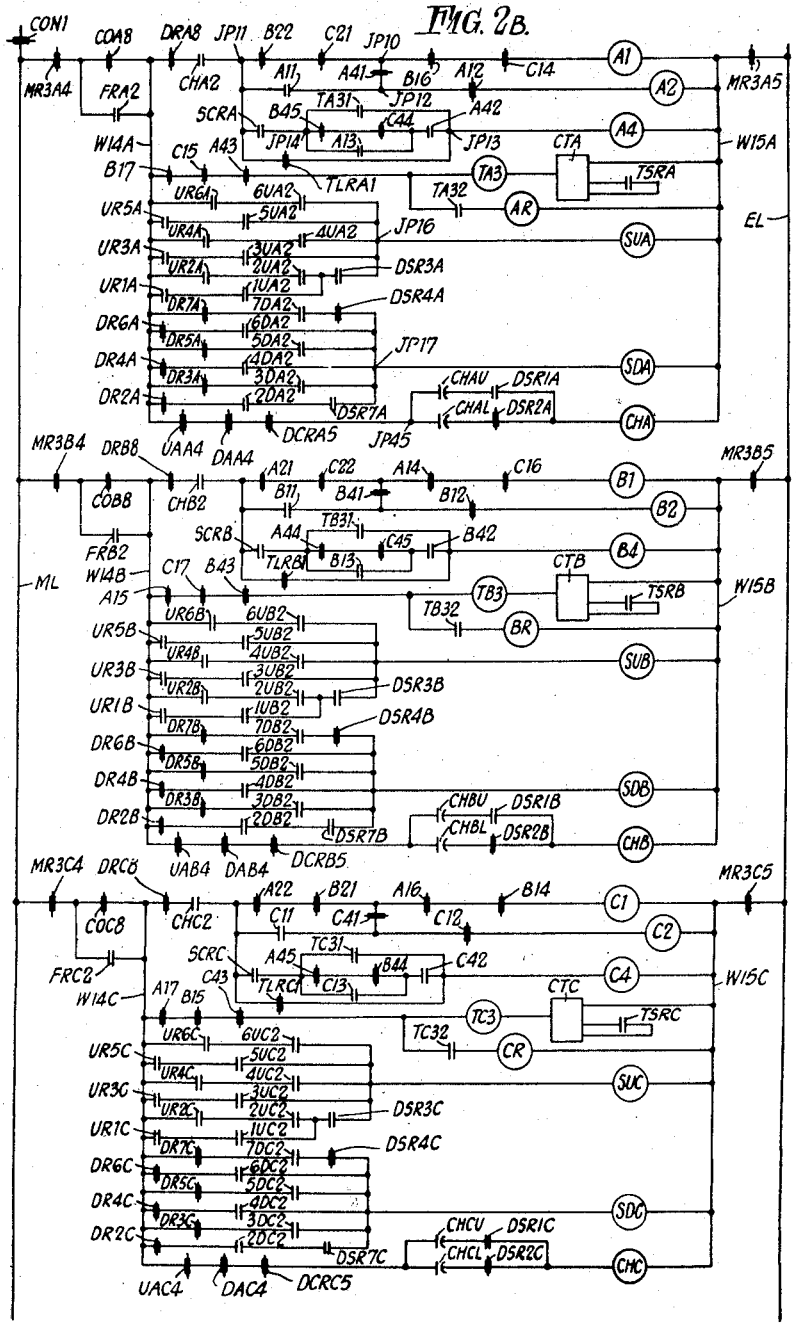
Figure 3A:
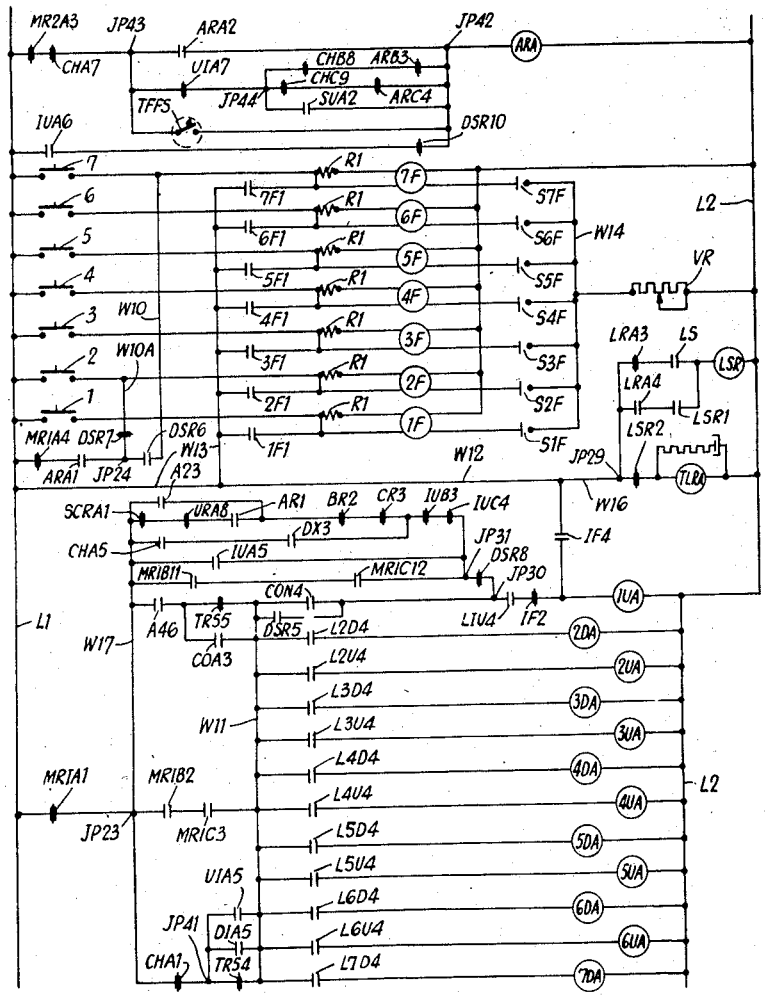
Figure 3B:
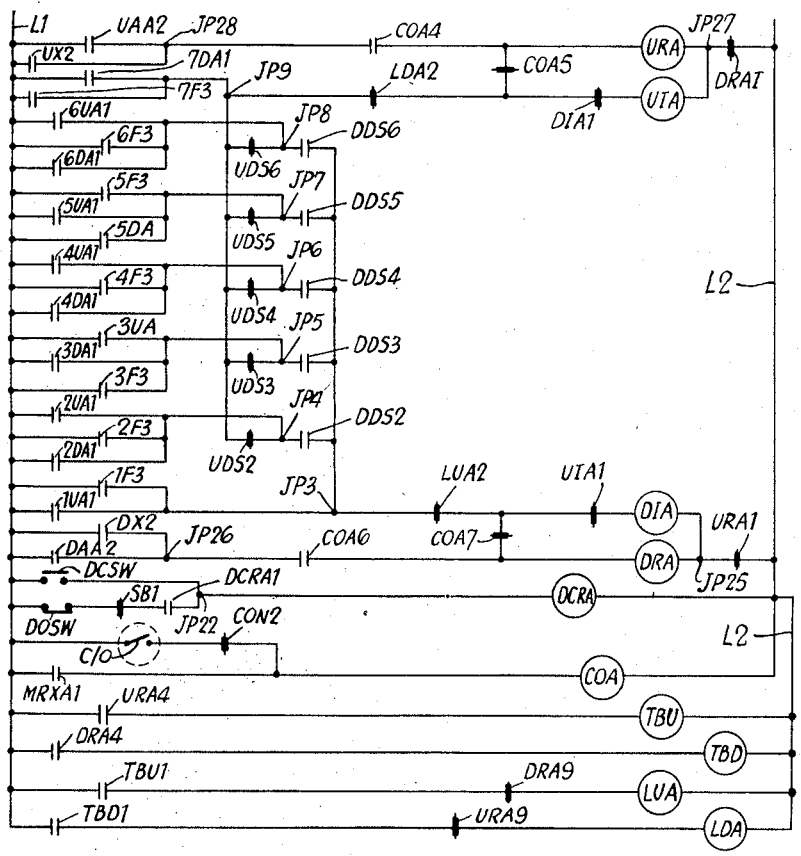
Figure 7:
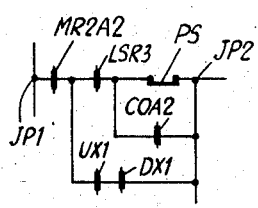
Figure 8:
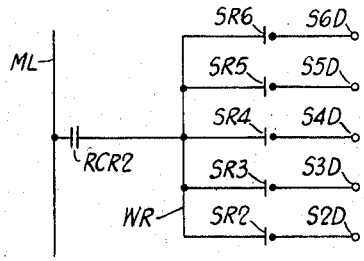
Figure 9:
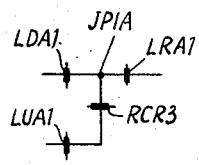
Figure 10:
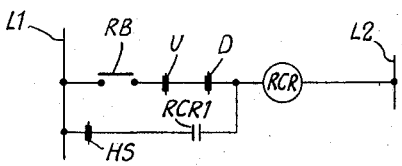
Figure 4:
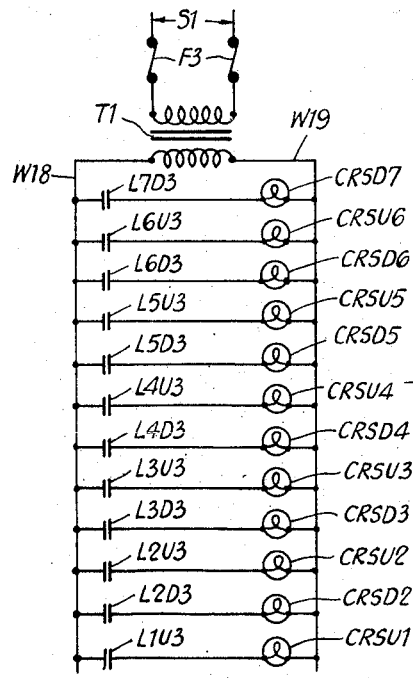
Figure 5:
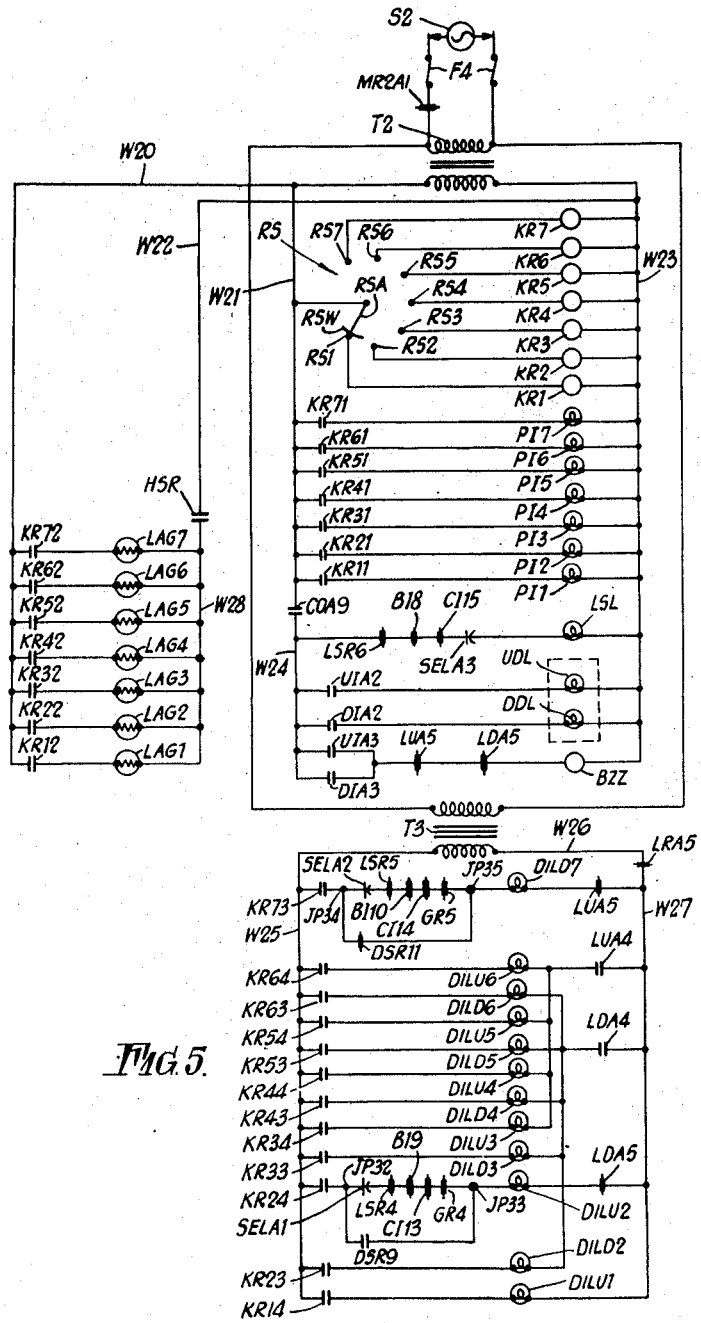
Figure 6:
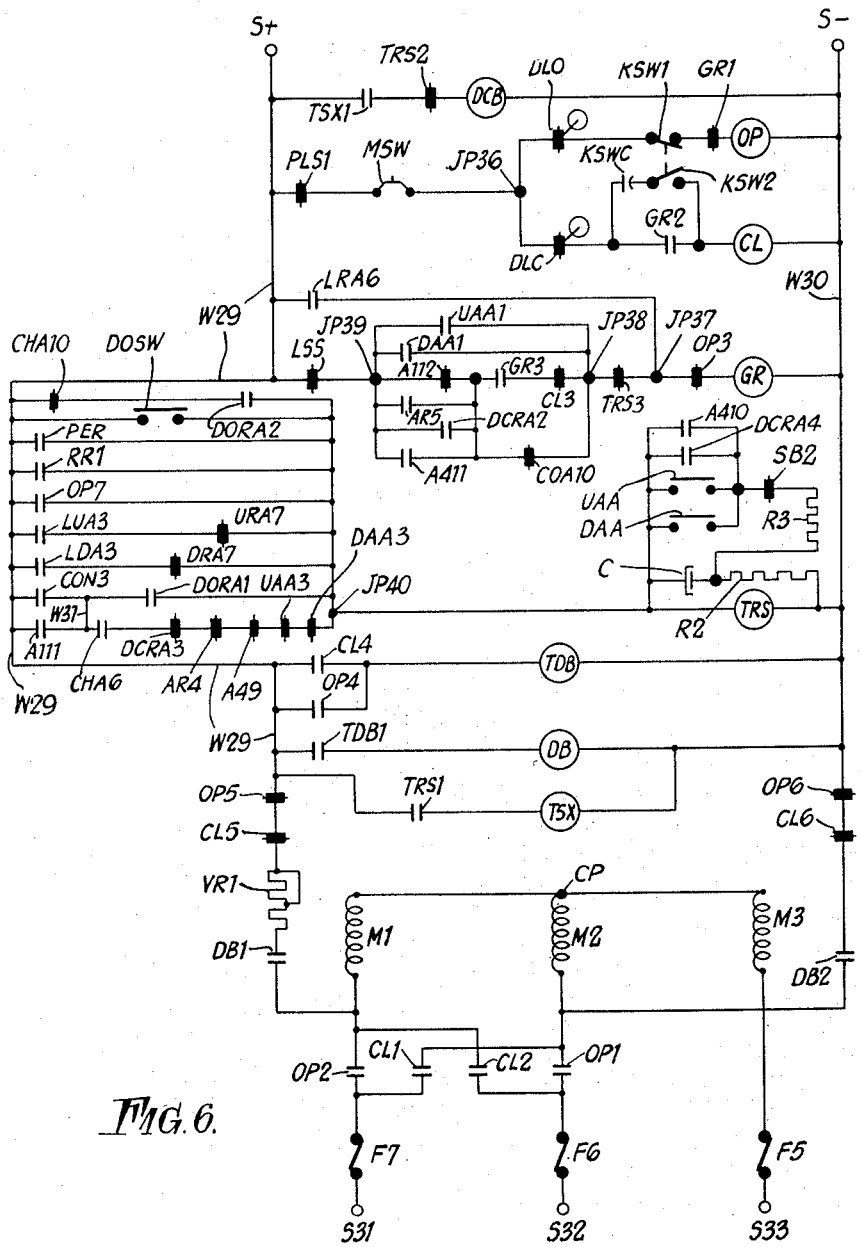
Figure 11:
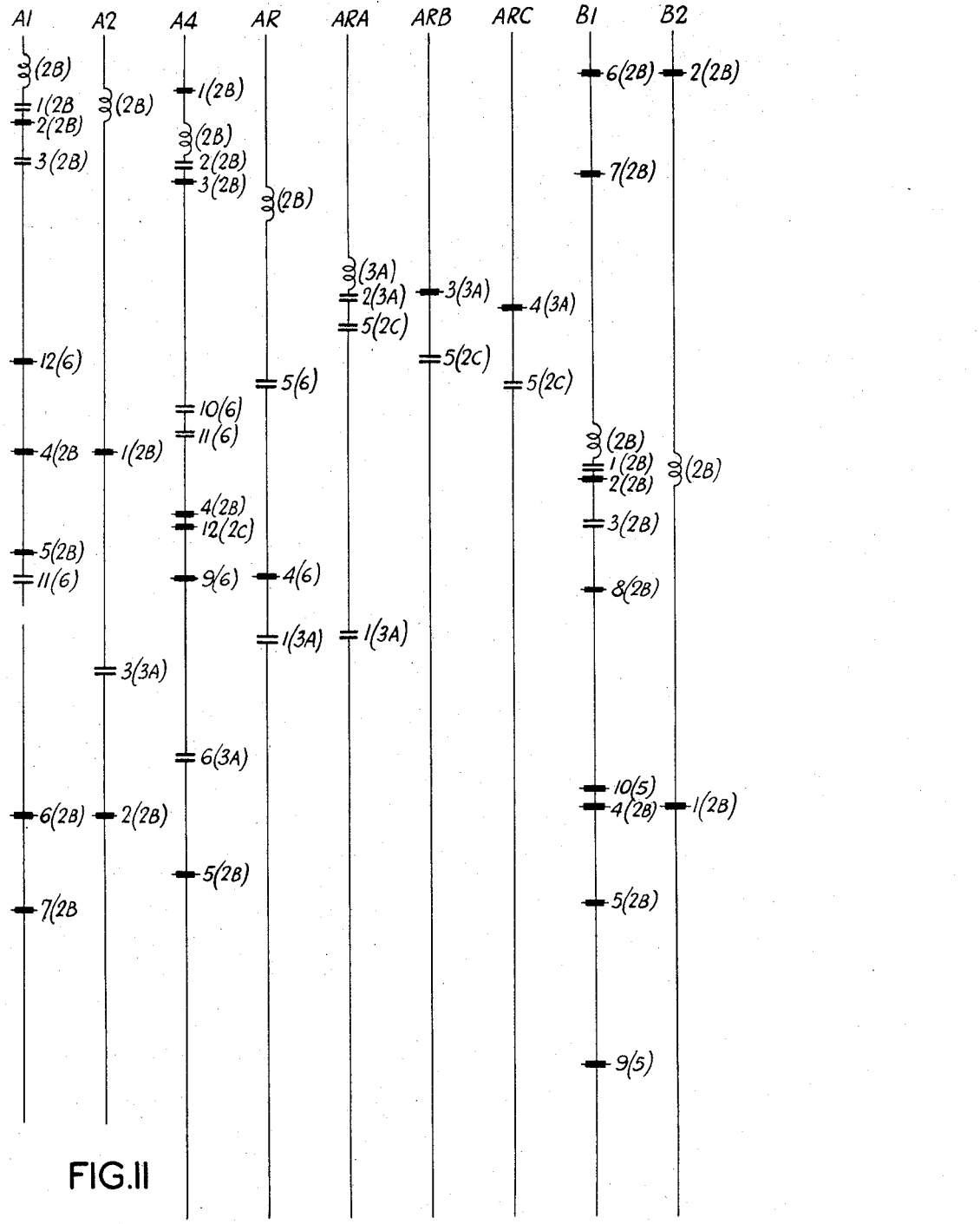
Figure 12:
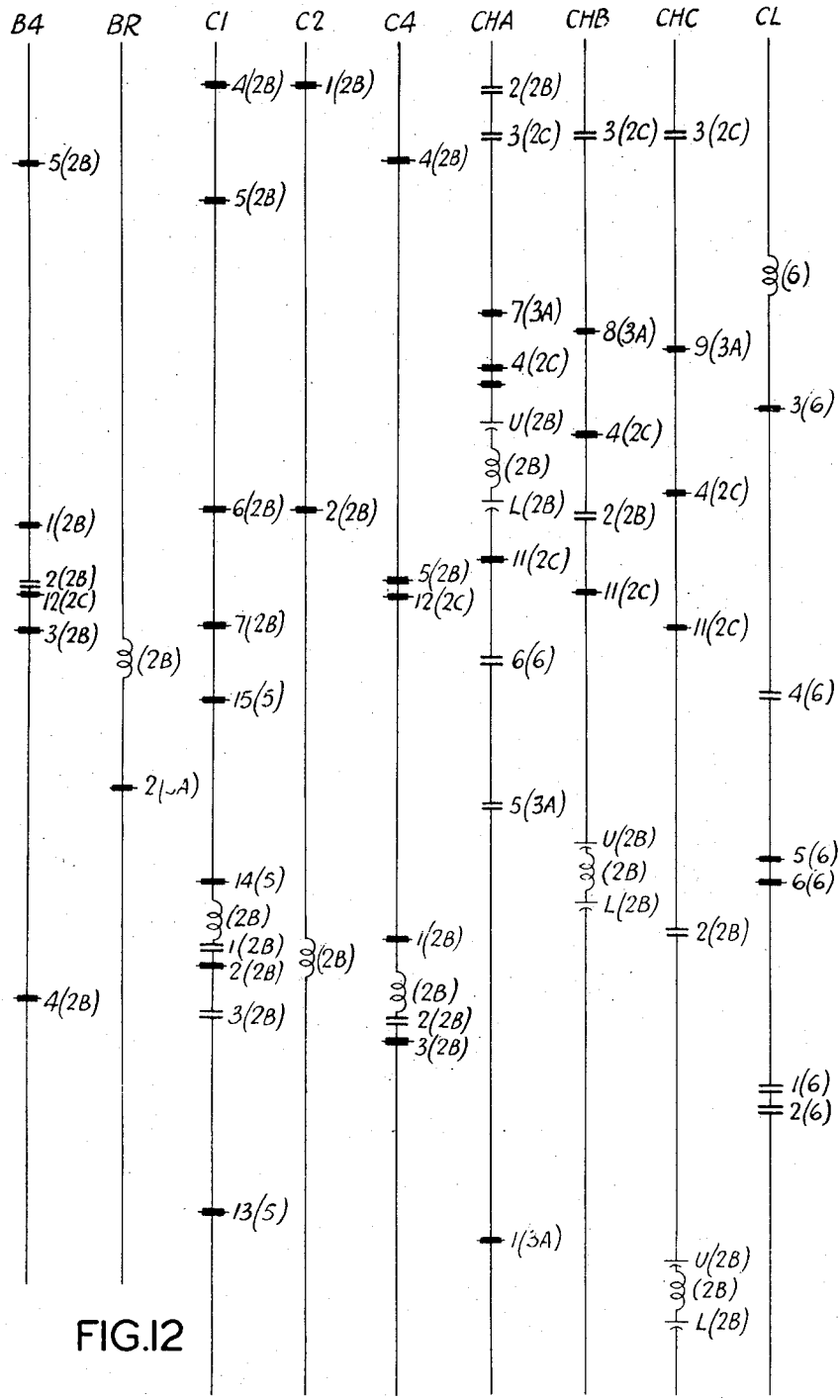
Figure 13:
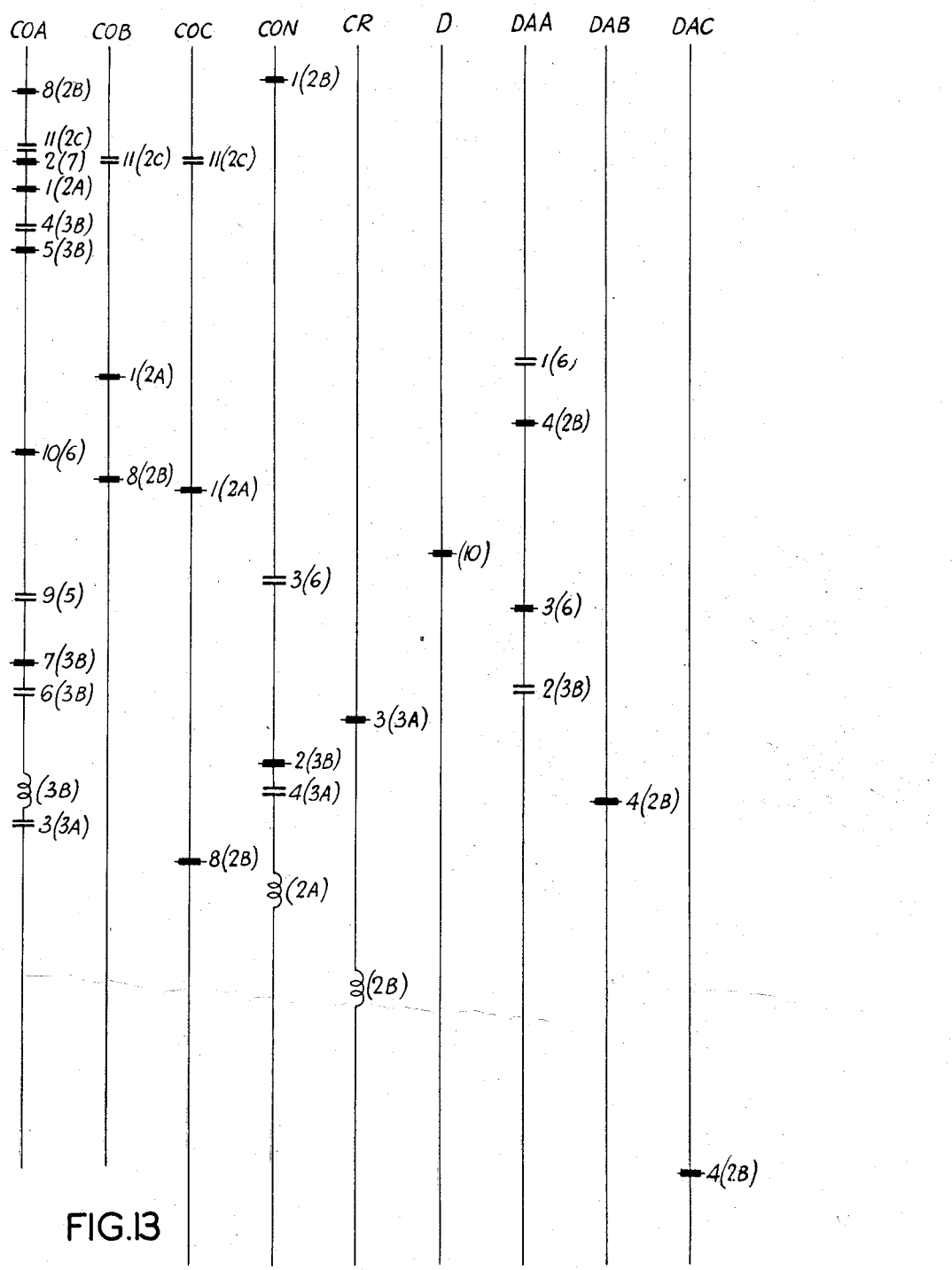
Figure 17:
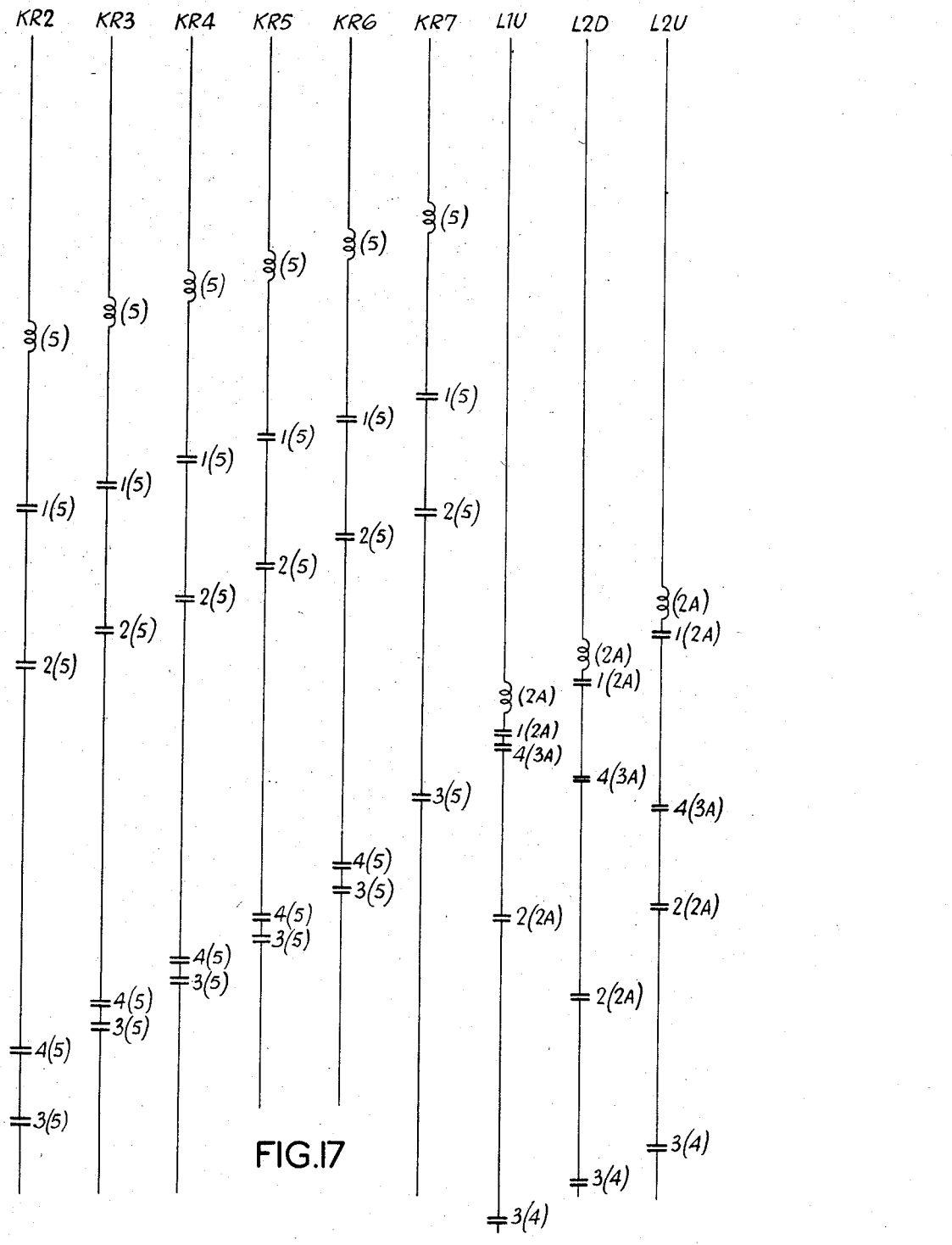
Figure 18:
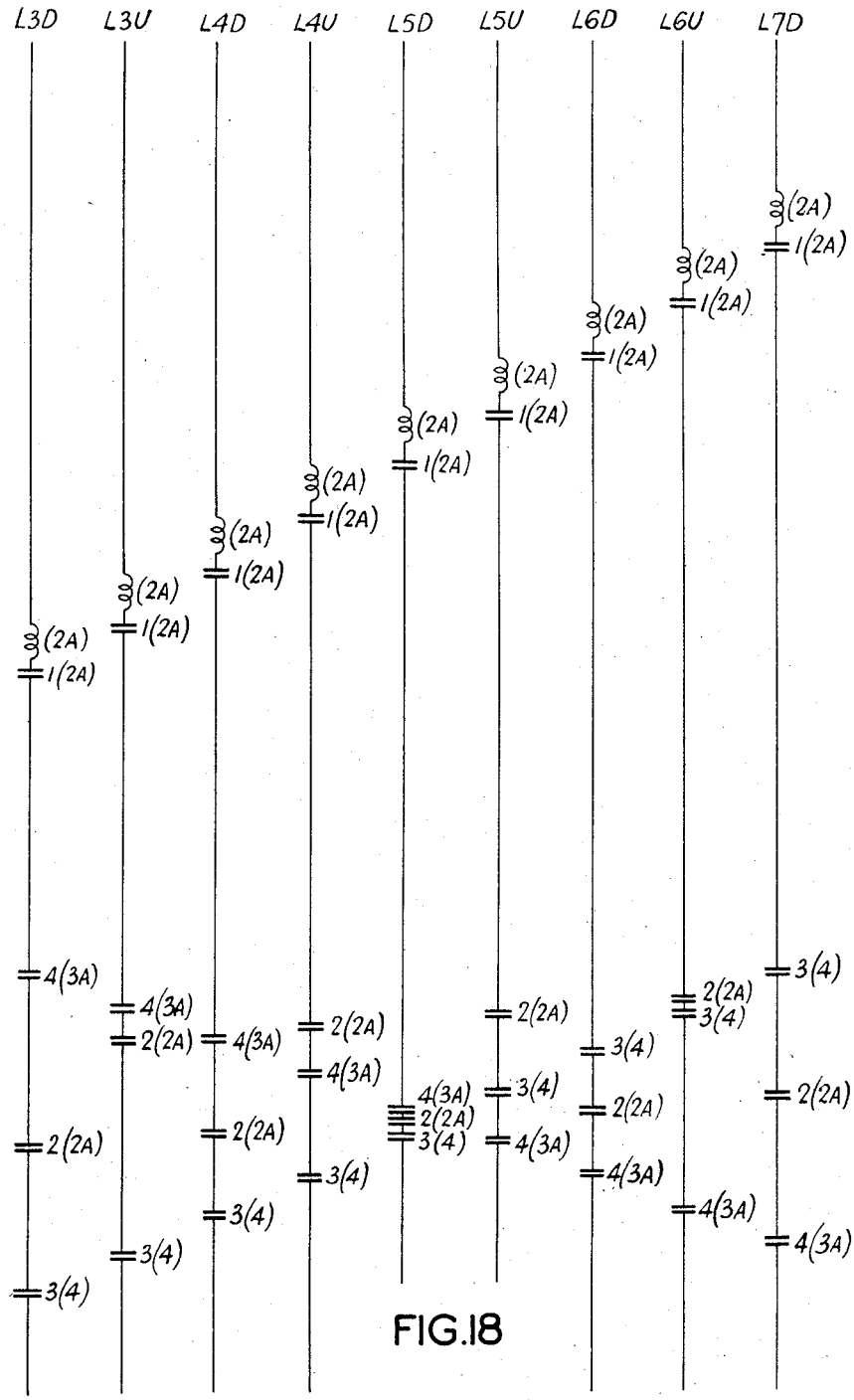
Figure 24:
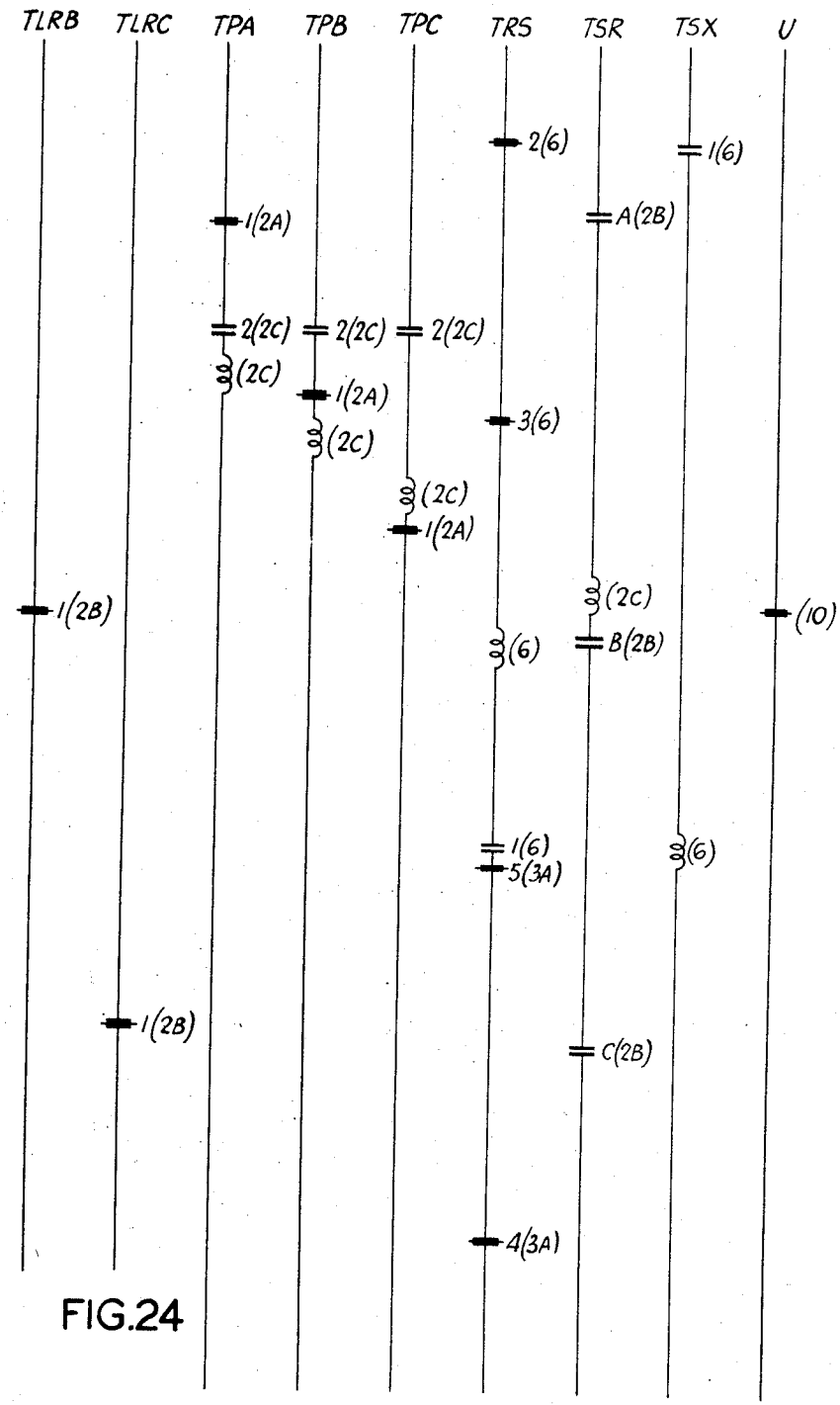
Figure 25:
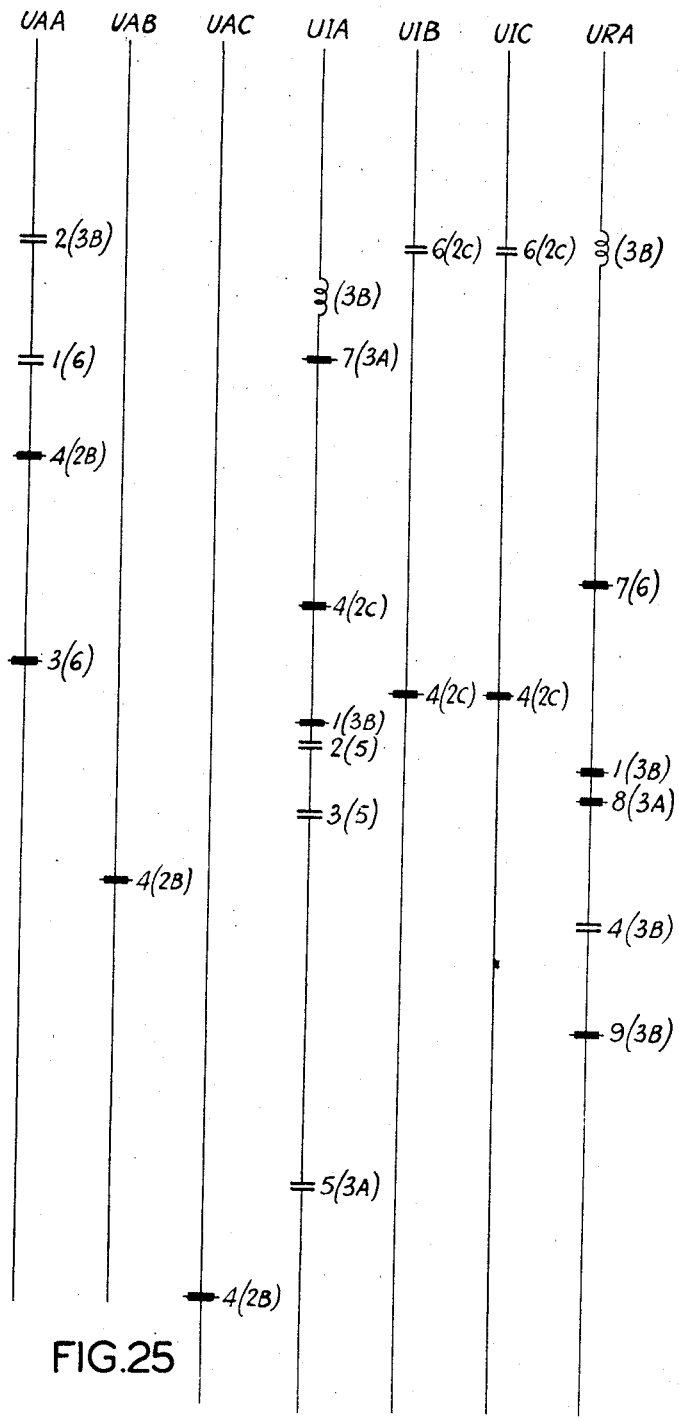
Figure 26:
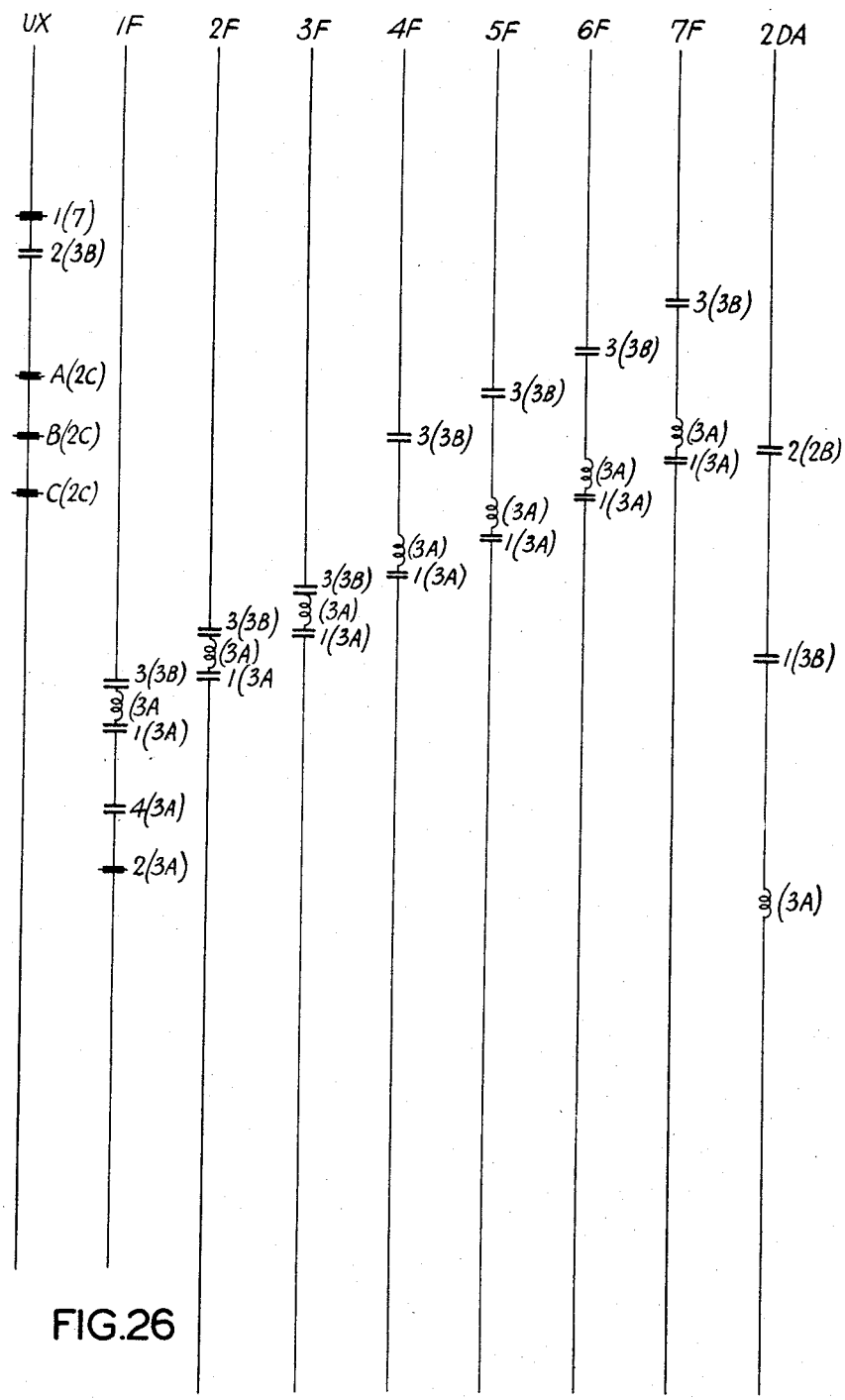
Figure 27:
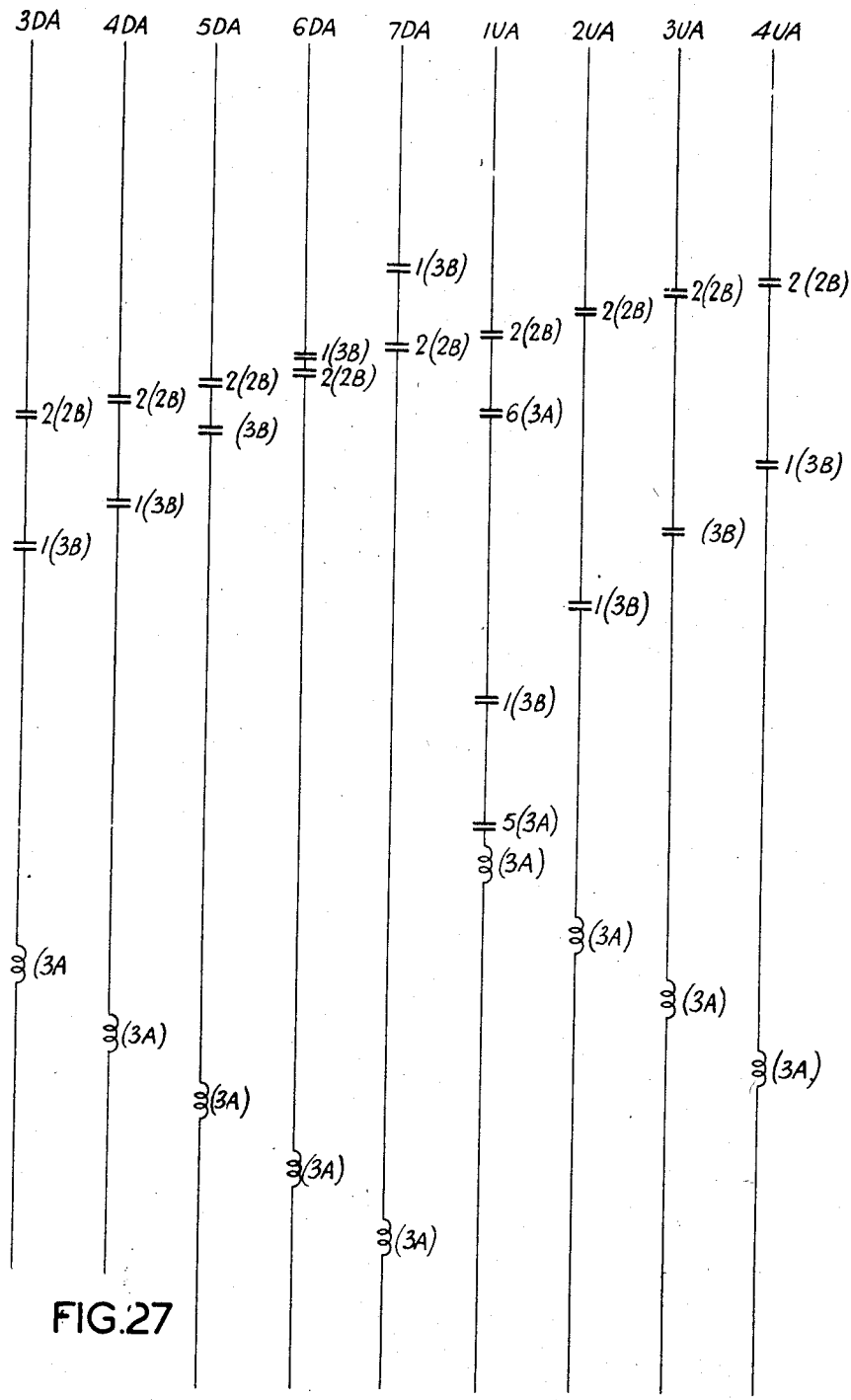
Figure 28:
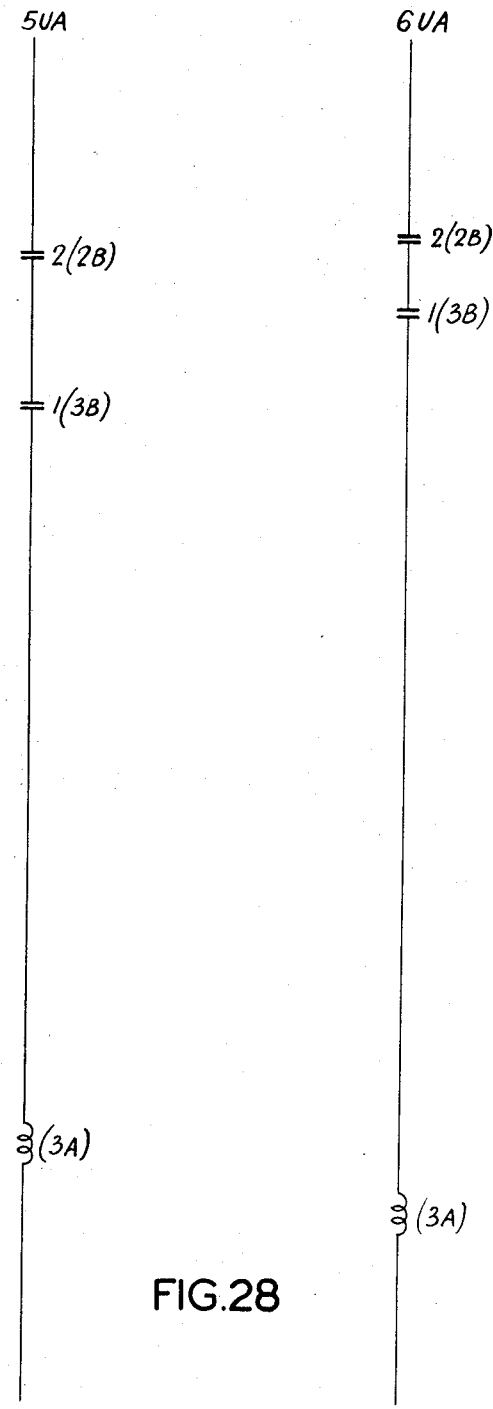

For a better understanding of the invention and to show how the same may be carried into effect, reference will now be made to the accompanying drawings, in which:

Figure 1 is a diagram of a three car lift system arranged for serving seven floors, Figures 2A, 2B and 2C are circuit diagrams of parts of a despatch signal initiating system for use in conjunction with the three car lift system of Figure 1, Figures 3A and 3B together form a simplified circuit diagram of part of the motor control circuit for one of the cars of the system of Figure 1, this part being additionally a part of the despatch signal initiating system, Figure 4 is a circuit diagram of part of the indicating system of the lift system of Figure 1, Figure 5 is a circuit diagram of the part of the indicating system associated with one of the cars, Figure 6 is a circuit diagram of door closing mechanism associated with one of the cars, Figure 7 is a circuit diagram of a further part of the motor control circuit, Figures 8 to 10 are circuit diagrams of call re-registration means, and Figures 11 to 28 are key sheets for Figures 2A to 10 showing the relay coils and their associated contacts in spindle form. The references in brackets indicate the figure in which the relevant coil or pair of contacts appears.

To facilitate an understanding of the lift system, the following apparatus is listed:

A1, B1, C1—First selected car relay coils for the cars A, B and C respectively.
A2, B2, C2—Second selected car relay coils.
A4, B4, C4—Despatch signal relay coils.
AR, BR, CR—Auxiliary time despatch relay coils.
ARA, ARB, ARC—Auto-return relay coils.
CHA, CHB, CHC—Call hold relay coils.
CL—Door close relay coil.
COA, COB, COC—Automatic/attendant changeover relay coils.
CON—Night service relay coil.
D, U—Down and up main reversing contactors respectively.
DAA, DAB, DAC—Down attendant relay coils.
UAA, UAB, UAC—Up attendant relay coils.
DB—Dynamic braking relay coil.
DCB—Door closing buzzer.
DCRA, DCRB, DCRC—Door close relay coils.
DIA, DIB, DIC—Down selection relay coils.
UIA, UIB, UIC—Up selection relay coils.
DORA, DORB, DORC—Door opening relay coils.
DRA, DRB, DRC—Down directional relay coils.
URA, URB, URC—Up directional relay coils.
DSR—Downward despatch relay coil.
DX, UX—Down and up auxiliary relay coils respectively.
FRA, FRB, FRC—Motor field relay coils.
GR—Door operating relay coil.
HS—High speed contactor.
HSR—High speed slow-down relay coil.
KR1 to KR7—Indicator relay coils.
L1U to L6U—Up landing call relay coils.
L2D to L7D—Down landing call relay coils.
LDA, LDB, LDC—Down reverse relay coils.
LUA, LUB, LUC—Up reverse relay coils.
LDX—Down auxiliary landing call relay coil.
LUX—Up auxiliary landing call relay coil.
LRA, LRB, LRC—Levelling relay coils.
LSR—Load switch relay coil.
LSS—Low speed relay coil.
MR1A, MR2A, MR3A, MR1B, MR2B, MR3B, MR1C, MR2C, MR3C, MRXA, MRXB, MRXC—Maintenance relay coils.
OP—Door open relay coil.
PER—Photoelectric cell operated relay coil.
PLS—Prelevelling speed relay coil.
RCR—Call re-registration relay coil.
RR—Door edge reversing switch.
SB—Suicide relay coil.
SCR—Service call relay coil.
SDA, SDB, SDC—Down routing relay coils.
SUA, SUB, SUC—Up routing relay coils.
TA3, TB3, TC—Time despatch relay coils.
TBD, TBU—Down and up time reverse relay coils, respectively.
TDB—Time dynamic braking relay coil.
TLRA, TLRB, TLRC—Time load relay coils.
TPA, TPB, TPC—Time pass relay coils.
TRS—Time reversing relay coil.
TSR—Time shortening relay coil.
TSX—Time door closing buzzer relay coil.
1F to 7F—Car button relay coils.
2DA to 7DA, 2DB to 7DB and 2DC to 7DC—Down direction relay coils.
1UA to 6UA, 1UB to 6UB and 1UC to 6UC—Up direction relay coils.

*General arrangement and operation*

The lift system shown diagrammatically in Figure 1 has three cars A, B and C balanced by counterweights CWA, CWB and CWC respectively and arranged to serve seven floors or landings under the control of car driving mechanism contained in the block CDM. The cars are arranged to be started in response to landing calls or car calls, either automatically or by an attendant in each car. If desired, one or two of the cars can be operated on attendant control, whilst the remaining car(s) is/are on automatic control.

Push-button boxes 1PB, 2PB . . . 7PB are located one at each floor. The box at the lowest floor (1st floor) has one push-button 1U and the box at the highest floor (7th floor) has a single push-button 7D, whilst the remaining boxes each have two buttons 2D, 2U; 3D, 3U; . . . 6D, 6U. The buttons in these boxes are common to all three cars. Each car has seven push-button switches 1 to 7 for registering calls made from within the car. The switches 1 to 7 correspond to the 1st to 7th floors respectively.

Ground level corresponds to the 2nd floor, the 1st floor being a basement.

The cars are each driven by an electric motor (not shown) and the three electric motor control systems so far as actual starting and stopping of the cars are concerned, are known and will not be described in this respect herein, since they do not form part of the present invention. Suffice it to say that the electric motor control systems are well known so-called "collective" systems, each of which moves the associated car (except when the associated car becomes a free car as described hereinafter) so that the car on each trip stops, for one direction of movement, to attend to calls in registration for that direction, reverses when at that point to which the car has been called that is furthest from the starting floor and then returns to the starting floor, attending on the way to calls in registration for this direction of movement. The starting floor is known as the despatching floor and in the lift system to be described will be either the second floor for upward despatch or the seventh floor for downward despatch, there being a traffic selection switch TSS for selecting the form of despatch desired. This switch is located at the second floor. The despatch signal initiating system hereinafter termed the "despatcher" is arranged for giving a despatch signal to a car located at the despatching floor when a landing call cannot be dealt with by a car already in transit, the call therefore requiring an idle car to be despatched to serve the call. Once a car has been despatched from the terminal floor it no longer is under the influence of the despatcher, except that the car can pick up landing calls registered after despatch. The despatcher, however, is influenced by the car.

In order to minimise bunching of the cars in transit the despatcher is arranged so that it does not necessarily immediately give a despatch signal to an idle car at the despatching floor upon receipt of a call for further service. A despatch signal can only occur after a predetermined despatch interval has elapsed. This interval is usually the average round trip time for each car divided by the number of cars in the system. The delay between the receipt of the call for further service (service call) and the initiation of a despatch signal is, however, not constant and depends upon the conditions prevailing as will be explained hereinafter.

*Despatch signal initiating system*

Referring now to the despatcher circuit, Figure 2A shows that part of the circuit that registers landing calls and cancels these calls when they have been served by a car, Figure 2B shows that part of the despatcher circuit that selects the order in which the cars receive despatch signals, and the part that governs the operation of routing selectors, and Figure 2C shows in the upper portion thereof the part of the circuit that supervises calls to ascertain whether a call for further service (service call) is to be made, the central portion showing the part that controls operation of time pass relay coils whilst the lower half of this figure shows the part of the circuit for regulating the despatch interval in accordance with the positioning of the cars and with the type of despatch selected. Figure 3A shows in the upper portion thereof means for returning the cars to the despatching floor, the part of the motor circuit that registers and cancels calls made in the car A, and the circuit of a load sensitive device. The lower portion of Figure 3A shows the part of the circuit that controls the selection of car A for basement service and that which registers landing calls on the car. Figure 3B shows inter alia the part of the motor circuit that selects the direction of movement of the car A.

*Landing call registration and cancellation*

Reverting to Figure 2A, the primary winding of a transformer T is connected through fuses F1 and a mains switch MS to an alternating current supply S. The secondary winding of the transformer T is connected through a rectifier bridge RB to apply D. C. potential as between a line EL which is earthed and a main line ML. The main line is connected to the bridge RB through the intermediary of a test link TL and a fuse F2. Each push-button 1U to 7D controls an associated switch, one side of which is connected to the main line ML and the other side of which is connected through a resistance R and one winding of an associated relay coil L1U to L7D to a common wire W1 which leads to the earth line EL. The relay coils L1U to L7D each have two windings, the two windings of each relay coil being oppositely wound. It is to be noted that in most of Figures 2A to 10 each relay coil has been shown, for the sake of simplicity, as a circle with the reference in the circle. In Figures 11 to 28 the relay coils have been indicated by the conventional symbol. The coils L1U to L7D control associated contacts L1U1 to L7D1 (Figure 2A), L1U2 to L7D2 (Figure 2A), L1U3 to L7D3 (Figure 4) and L1U4 to L7D4 (Figure 3A). All these contacts are open when their associated coils are unenergised and vice versa. One contact of each of the pairs L1U1 to L7D1 and L3U2 to L6D2 is connected to a common wire W2 which is joined to the main line ML. One contact of each of the pairs L1U2 and L2U2 is joined to the wire W2 through normally open contacts DSR3U and one contact of the pair L2D2 is joined to the wire W2 through normally open contacts DSR3D. One contact of the pair L7D2 is joined to the wire W2 through normally closed contacts DSR4D. The contacts DSR3U, DSR3D and DSR4D are controlled by a relay coil DSR (Figure 2C) which is energised when it is desired to despatch from the 7th floor. The other contact of each of the pairs L2D2, L3D2, L4D2 . . . L7D2 is connected through a down auxiliary landing button relay coil LDX to a wire W3 that is joined to the line EL. The other contact of each of the pairs L1U2, L2U2, L3U2, L6U2 is connected through an up auxiliary landing button relay coil LUX to the wire W3. The other contacts of the pairs L1U1 to L7D1 are connected respectively to junction points SL1U to SL7D, through the other windings of relay coils L1U to L7D. Said other contacts of the pairs L1U1, L2D1 . . . L7D1 are also each connected to the push-button switch side of that resistance R that is in series with the associated coil L1U, L2D . . . L7D. The junctions SL2U, SL3U, SL4U, SL5U, SL6U and SL7D are respectively connected through contacts SL2UA, SL3UA, SL4UA . . . SL7DA to a wire W4. These contacts are operated to close in accordance with the position of the car A. When the car A is at the third floor the contacts SL3UA will be closed and when at the fourth floor the contacts SL4UA will be closed and so on. The wire W4 is connected through normally closed contacts MR3A1, a variable resistance VRA1 and normally closed contacts LDA1 to a junction point JP1A. Junction points SL1U, SL2D, SL3D, SL4D, SL5D and SL6D are respectively connected through contacts SL1UA, SL2DA, SL3DA ... SL6DA to a wire W5, these contacts being also operated by the car A in accordance with its position. The wire W5 is connected through normally closed contacts MR3A2, a variable resistance VRA2 and normally closed contacts LUA1 to the junction point JP1A which latter is connected through normally closed contacts LRA1, COA1, TPA1 and MR3A3 to the earth line EL. Normally open contacts FRA1 are connected across the contacts COA1. The junction points SL2U, SL3U, SL4U, SL5U, SL6U and SL7D are respectively connected through contacts SL2UB, SL3UB, SL4UB, SL5UB, SL6UB and SL7DB operated by the car B according to its position, to a wire W6 which latter is joined through normally closed contacts MR3B1, a variable resistance VRB1 and normally closed contacts LDB1 to a junction point JP1B. The junction points SL1U, SL2D, SL3D, SL4D, SL5D SL6D are respectively connected through contacts SL1UB, SL2DB, SL3DB, SL4DB, SL5DB and SL6DB operated by the car B according to its position, to the wire W7 which latter is joined through normally closed contacts MR3B2, a variable resistance VRB2 and normally closed contacts LUB1 to the junction point JP1B. The junction point JP1B is connected through normally closed contacts LRB1, COB1, TPB1, and MR3B3 to the earth line EL. Normally open contacts FRB1 are connected across the contacts COB1. The junction points SL2U, SL3U, SL4U, SL5U, SL6U and SL7D are respectively connected through contacts SL2UC, SL3UC ... SL7DC operated by the car C according to its position, to a wire W8 that is joined through normally closed contacts MR3C1, a variable resistance VRC1 and normally closed contacts LDC1 to a junction point JP1C. The points SL1U, SL2D, SL3D, SL4D, SL5D and SL6D are respectively connected through contacts SL1UC, SL2DC ... SL6DC operated by the car C according to its position, to a wire W9 that is joined through closed contacts MR3C2, a variable resistance VRC2 and normally closed contacts LUC1 to the junction point JP1C which is connected through normally closed contacts LRC1, COC1, TPC1 and MR3C3 to the earth line EL. Normally open contacts FRC1 are connected across the contacts COC1. The three electric motors that drive the three cars each have a relay coil (not shown) in the field winding thereof, the coil in the case of the car A closing the contacts FRA1 when the field winding is energised. Similarly, in the case of the car B when the motor field winding is energised the contacts FRB1 are closed, and in the case of the car C when the field winding is energised the contacts FRC1 are closed. The contacts LRA1, LRB1 and LRC1 are controlled by relay coils (not shown) in the motor circuits of the cars A, B and C respectively, so that these contacts close when the associated car is stopping or is stationary. The contacts LDA1, LDB1 and LDC1 are controlled by coils LDA, LDB and LDC (only LDA of which is shown—Figure 3B) in the motor circuits of the cars A, B and C respectively, these contacts being open when the car is going down (and for a short time after the car has stopped going down) and closed at other times. The contacts LUA1, LUB1 and LUC1 are similarly controlled by coils LUA, LUB and LUC (only LUA of which is shown—Figure 3B) to be open when the associated car is going up (and for a short time after the car has stopped going up) whilst being closed at other times.

The contacts COA1, COB1 and COC1 are controlled by relay coils COA, COB, COC (only COA of which is shown—Figure 3B) to be closed when the associated car is on automatic operation and to be open when the associated car is on attendant operation. The contacts TPA1, TPB1 and TPC1 are operated by relay coils TPA, TPB, TPC in the selector circuit (Figure 2C) to be closed except when the associated car has been delayed at a floor (other than the despatching floor) for more than a predetermined time.

A normally open maintenance switch MSA having three operative positions has one pole MSA1 thereof connected to the wire W2. A pole MSA2 of the switch is connected through maintenance coils MR1A, MR2A and MR3A to the wire W3. A pole MSA3 of the switch is connected through a coil MRXA to the wire W3. A point between the pole MSA3 and the coil MRXA is connected through contacts MRXA2 to a point between the pole MSA2 and the coil MR1A. Similar maintenance switches MSB and MSC are provided and these control similar coils MR1B, MR2B, MR3B, MRXB, MR1C, MR2C, MR3C and MRXC. The coil MR1A controls the contacts MR1A1 to MR1A12, the coil MR1B, the contacts MR1B1 to MR1B12 and the coil MR1C, the contacts MR1C1 to MR1C12. The coil MR2A controls the contacts MR2A1, MR2A2 and MR2A3, and the coils MR2B and MR2C control contacts (not shown) similar to MR2A1, MR2A2 and MR2A3, in the indicating system of cars B and C. The coils MR3A, MR3B and MR3C control the contacts MR3A1 to MR3A7, MR3B1 to MR3B7 and MR3C1 to MR3C7 respectively. The coil MRXA controls contacts MRXA1 and MRXA2, the coil MRXB controlling contacts MRXB1 and MRXB2, and the coil MRXC controlling contacts MRXC1 and MRXC2. The contacts MRXB1 and MRXC1 are not shown since they are in the motor circuit of cars B and C.

A night service relay coil CON controlling contacts CON1 (Figure 2B), contacts CON2 (Figure 3B), contacts CON3 (Figure 6), and contacts CON4 (Figure 3A), is connected in series with a switch SW between the wires W2 and W3. If desired, the switch SW may be ganged with, or part of, the switch TSS so that the switches can be operated by one control knob. When the switch SW is open the coil CON is unenergized and the contacts CON1 and CON2, are closed, the contacts CON3 and CON4 being open. When the switch SW is closed, the coil CON is energized and the contacts CON1 open to render the parts of the despatcher shown in Figures 2B and 2C ineffective. The contacts CON2 also open when the coil CON is energized whilst the contacts CON3 and CON4 close.

The push-button switches of the push-buttons 1U to 7D are respectively ganged with further switches 1UU to 7DD one side of each of which is connected to the main line ML. The other sides of the switches 1UU to 7DD are respectively connected through contacts 1CUA to 7CDA to one side of a door opening coil DORA, through contacts 1CUB to 7CDB to one side of a door opening coil DORB and through contacts 1CUC to 7CDC to one side of a door opening coil DORC. The other sides of the coils DORA, DORB and DORC are connected to the wire W1. The contacts 1CUA to 7CDA are operated by the car A to be closed when the car is at the floor concerned. Thus contacts 4CUA and 4CDA are closed when the car A is at the fourth floor. The contacts 1CUB to 7CDB are similarly operated by the car B and the contacts 1CUC to 7CDC are similarly operated by the car C. The coils DORA, DORB and DORC serve for opening the doors of car A, B and C respectively as described hereinafter.

The part of the despatching circuit so far described operates as follows. Presuming that the cars are on automatic operation so that the contacts COA1, COB1, COC1 are closed or, when on attendant operation, presuming that all the three car motor field windings are energised whereby the contacts FRA1, FRB1 and FRC1 are closed, then the circuits between the contacts LRA1 and TPA1, between the contacts LRB1 and TPB1 and between the contacts LRC1 and TPC1 will be closed. Switches MSA, MSB and MSC will be open when all three cars are in normal operation. Assume that a passenger on the 4th floor desires to ascend, the button 4U will be pressed momentarily. This will energise the coil L4U momentarily through the circuit: line ML, switch closed by the button 4U, resistance R, coil L4U, wire W1 and line EL. Energisation of the coil L4U closes the contacts L4U1 so that the coil L4U now becomes and remains energised through the circuit: line ML, wire W2, contacts L4U1, resistance R, coil L4U, wire W1 and line EL. If the car A is proceeding upwardly the contacts LUA1 will be open and the contacts LDA1 closed. Whilst the car is being driven by its electric motor the contacts LRA1 will be open. When the car slows down to stop at the 4th floor, the contacts LRA1 will close and when the car reaches the 4th floor, the contacts SL4DA and SL4UA will close. Said other winding of the relay coil L4U will then be energised since the coil side contact of the contacts L4U1 will be connected through said other winding, the closed contacts SL4UA, the wire W4, the closed contacts MR3A1, LDA1, LRA1, FRA1 and/or COA1, TPA1 and MR3A3 to the earth line EL. Energisation of said other winding of the coil L4U causes the energising effect of said one winding of this coil to be overcome and all the contacts controlled by the coil change from the closed to the open position, so that the call from button 4U is cancelled. The passenger now enters car A, which has stopped at the 4th floor. It is to be noted that if another passenger at the 4th floor has pressed the button 4D the car A would not be able to attend to this call since it would be on an upward trip. The closing of the contacts SL4DA, however, would not cause the 4D call to be cancelled since said other winding of the coil L4D would not be energised by the arrival of the car A at the 4th floor in view of the fact that the contacts LUA1 would be open for an upward travelling car. The 4D call would therefore still remain in registration. If, say, the car A had, on attendant operation, been driven through the 4th floor without stopping, the 4U call would not have been cancelled by the closing of the contacts SL4UA since the contacts LRA1 would have been open and the cancelling circuit would therefore not have been closed.

Energisation of the coil L4U would have closed the contacts L4U2 in series with the coil LUX. The coil LUX controls contacts LUX1, LUX2A, LUX2B and LUX2C. The coil LDX controls contacts LDX1, LDX2A, LDX2B and LDX2C (Figure 2C). The contacts LUX1 and LDX1 exercise a control on the service call circuit.

*Car call registration and car direction selection*

The circuit shown in Figures 3A and 3B is part of the motor circuit for the motor that drives car A. It is to be understood that there are identical circuits for the other two motors. In the circuit of Figures 3A and 3B a line L1 is connected to one side of a D. C. supply and a line L2 is connected to the other side of the supply and earthed. One side of the coil COA is connected to the line L2 and the other side is connected through the contacts CON2 and a switch C/O to the line L1. The switch C/O is operated in accordance with whether the system is to be on automatic operation (C/O open) or attendant operation (C/O closed). If the switch SW (Figure 2A) is closed the contacts CON2 are open and the coil COA is de-energised irrespective of the position of the switch C/O. The coil COA controls contacts COA1 to COA11. The contacts MRXA1 are connected across the switch C/O and the contacts CON2.

The line L1 is connected to a junction point JP23 through contacts MR1A1. The point JP23 is joined to a point JP41 through normally closed contacts CHA1 controlled by a relay coil CHA (Figure 2B) that is (except in certain circumstances described later) energised when the car A is at a despatching floor. The point JP41 is connected to a wire W11 through contacts UIA5 controlled by an up selection relay coil UIA, through contacts DIA5 controlled by a down selection relay coil DIA and through contacts TRS4 controlled by a time reversing relay coil TRS (Figure 6) that is energised upon opening of the car doors, closure of the car doors occurring a predetermined time after de-energisation of the coil TRS. The point JP23 is connected to the wire W11 through the normally open contacts MR1B2 and MR1C3. The point JP23 is further connected to the wire W11 through normally open contacts A46 and normally closed contacts TRS5, normally open contacts COA3 being connected across the contacts TRS5. The contacts A46 are controlled by a coil A4 (Figure 2B) that gives the despatch signal to car A. The contacts TRS5 are controlled by the time reversing relay coil TRS.

One contact of each of the pairs L2D4, L2U4 . . . L6U4, L7D4 is connected to the wire W11. One contact of the pair L1U4 is connected to the wire W11 through contacts DSR5 controlled by the coil DSR. The other contacts of the pairs L2D4 to L7D4 are respectively connected through coils 2DA to 7DA to the line L2. The other contact of the pair L1U4 is connected through contacts 1F2 and a coil 1UA to the line L2. The side of the coil 1UA that is joined to the contacts 1F2 is also connected through contacts 1F4 to a wire W12 that is connected to the line L1 through a wire W13.

In the car A there are numbered push-buttons which control switches 1, 2, 3, 4, 5, 6, 7, one for each of the 1st to 7th floors. The switches 1 to 7 are connected respectively in series with one winding of coils 1F to 7F, and the series-connected switches and windings are connected between the lines L1 and L2. A resistance R1 is connected in series between each switch 1 to 7 and the associated coil 1F to 7F. The coils 1F to 7F have two opositely wound windings and control contacts 1F1 to 7F1, 1F2, 1F3 to 7F3 and 1F4, the first figure of each of the contact references corresponding with the figure of the associated coil reference. One contact of each of the pairs 1F1 to 7F1 is connected by the wire W13 to the line L1. The other contacts of these pairs are respectively connected through the other windings of the coils 1F to 7F and contacts S1F to S7F to a wire W14 that is joined via a variable resistance VR to the line L2. The contacts S1F are closed when the car A is at the 1st floor, the contacts S2F are closed when the car A is at the 2nd floor, and so on. Said other contacts of the pairs 1F1 to 7F1 are also respectively connected to the push-button switch side of the resistances R1, associated with said one windings of the coils 1F to 7F. A wire W10 is connected to a point between the switch 7 and the associated resistance R1 and leads through contacts DSR6 to a junction point JP24. A wire W10A is connected to a point between the switch 2 and the associated resistance R1 and leads through contacts DSR7 to the point JP24. The contacts DSR6 and DSR7 are controlled by the coil DSR. The point JP24 is connected through normally open contacts ARA1 and normally closed contacts MR1A4 to the line L1. The contacts ARA1 are controlled by an auto-return relay coil ARA to be closed when the car A is to be returned to the despatching floor.

The coils 1UA, 2DA, 2UA . . . 6UA, 7DA control the set of contacts 1UA1, 2DA1, 2UA1 . . . 6UA1, 7DA1 (Figure 3B) and the set of contacts 1UA2, 2DA2, 2UA2 . . . 6UA2, 7DA2 (Figure 2B). The coil 1UA also controls contacts 1UA3 and 1UA4 (not shown) in the basement circuits of the cars B and C, contacts 1UA5 in the basement circuit of the car A, and contacts 1UA6 in the auto-return circuit of car A. One contact of each of the pairs of the set of contacts 1UA1, 2DA1 . . . 7DA1 and of the set of contacts 1F3 to 7F3 is connected to the line L1. The other contacts of the pairs 1UA1 to 7DA1 and 1F3 to 7F3 are connected to junction points JP3 to JP9 as shown in Figure 3B. The junction points JP4 to JP8 are connected to the junction point JP9 through contacts UDS2 to UDS6 respectively. The junction points JP4 to JP8 are connected to the junction point JP3 through contacts DDS2 to DDS6 respectively. The contacts UDS2 to UDS6 and DDS2 to DDS6 are open or closed according to the position of the car A. When the car A is at the 1st floor, the contacts are in the position shown in Figure 3. When the car rises to the 2nd floor it opens contacts UDS2, both contacts UDS2 and DDS2 being open until the car has passed above the 2nd floor when the contacts DDS2 close. Similarly when the car reaches the 3rd floor the contacts UDS3 will open, both contacts UDS3 and DDS3 remaining open until the car has passed the 3rd floor when the contacts DDS3 close. The contacts at the 4th, 5th and 6th floors are similarly operated by the car A.

The junction point JP3 is connected through contacts LUA2 and UIA1 and the down selection relay coil DIA to a junction point JP25 that is connected through contacts URA1 to the line L2. The point JP25 is connected through a down direction relay coil DRA and contacts COA6 to a junction point JP26. This junction point is connected to the line L1 through contacts DX2 and DAA2 which are in parallel. The junction point JP9 is connected through contacts LDA2 and DIA1 and the up selection relay coil UIA to a junction point JP27 that is joined through contacts DRA1 to the line L2. The point JP27 is connected through an up direction relay coil URA and contacts COA4 to a junction point JP28. The junction point JP28 is connected to the line L1 through contacts UAA2 and UX2 that are in parallel with each other. The coil DIA controls the contacts DIA1 (Figure 3B), contacts DIA2 and DIA3 (Figure 5), contacts DIA4 (Figure 2C) and contacts DIA5 (Figure 3A). The coil DRA controls the contacts DRA1, DRA4 and DRA9 (Figure 3B), contacts DRA7 (Figure 6) and contacts DRA8 (Figure 2B). The coil UIA controls contacts UIA1 (Figure 3B), contacts UIA2 and UIA3 (Figure 5), contacts UIA4 and UIA6 (Figure 2C) and contacts UIA5 and UIA7 (Figure 3A). The coil URA controls the contacts URA1, URA4 and URA9 (Figure 3B), the contacts URA8 (Figure 3A) and contacts URA7 (Figure 6). The contacts LDA2 and LUA2 are controlled by coils LDA and LUA respectively. The contacts UAA2, together with contacts UAA1 and UAA3 (Figure 6) and UAA4 (Figure 2B) are controlled by a coil (not shown) that is energised by closure, when the system is on attendant operation, of an attendant-operated "up" push-button switch UAA (Figure 6) in the car A. The contacts DAA2, together with contacts DAA1 and DAA3 (Figure 6) and DAA4 (Figure 2B) are controlled by a coil (not shown) that is energised, when the system is on attendant operation, by closure of an attendant-operated "down" push-button switch DAA (Figure 6), also in the car A. A point between the contacts LUA2 and UIA1 is connected through contacts COA7 to a point between the contacts COA6 and the coil DRA. A point between the contacts LDA2 and DIA1 is connected through contacts COA5 to a point between the contacts COA4 and the coil URA.

One contact of the pair URA4 is connected to the line L1 and the other contact is connected through an up time reverse relay coil TBU to the line L2. One contact of the pair DRA4 is connected to the line L1 and the other is connected through a down time reverse relay coil TBD to the line L2. The coils TBU and TBD control contacts TBU1 and TBD1 respectively. These relay coils are of the kind that cause their associated contacts to close immediately upon energisation, but upon interruption of the coil circuits the associated contacts open after a predetermined time delay. One contact of the pair TBU1 is connected to the line L1 and the other is connected through the contacts DRA9 and the coil LUA to the line L2. One contact of the pair TBD1 is connected to the line L1 and the other is connected through contacts URA9 and the coil LDA to the line L2. The coil LUA controls the contacts LUA1 and LUA2 already mentioned, and also contacts LUA3 (Figure 6) and contacts LUA4 and LUA5 (Figure 5). The coil LDA controls the contacts LDA1 and LDA2 already mentioned and also contacts LDA3 (Figure 6) and contacts LDA4 and LDA5 (Figure 5). When the coil URA is energised the contacts URA4 close and the coil TBU is energised so that the contacts TBU1 close and the coil LUA is energised. Upon de-energisation of the coil URA the contacts URA4 open and the coil TBU allows the contacts TBU1 to open after the time delay already mentioned and the coil LUA then becomes de-energised. It will be seen, therefore, that the coil LUA becomes energised at the same time as the coil URA but becomes de-energised a predetermined period of time after de-energisation of the coil URA. Similarly, the coil LDA becomes energised at the same time as the coil DRA but becomes de-energised a predetermined time after de-energisation of the coil DRA.

A wire W16 leads from the wire W12 to a junction point JP29 which is connected through contacts LRA3, a load switch LS and a load switch relay coil LSR to the line L2. The coil LSR controls contacts LSR1 and LSR2 (Figure 3A), LSR3 (Figure 7) and LSR4, LSR5 and LSR6 (Figure 5). The contacts LSR1 are connected in series with contacts LRA4 and these series-connected contacts are connected across the contacts LRA3 and the switch LS. The junction point JP29 is additionally connected to the line L2 through the contacts LSR2 and a time load relay coil TLRA. The coil TLRA controls contacts TLRA1 (Figure 2B). The contacts LRA3 and LRA4 are operated by the same relay coil (not shown) that operates the contacts LRA1 already mentioned and also the contacts LRA5 (Figure 5) and LRA6 (Figure 6). The load switch LS is operated in accordance with the load in the car A. When the load reaches the predetermined amount the switch LS closes and provided the car is stationary, the contacts LRA3 will be closed so that the coil LSR will become energised. Energisation of this coil opens the contacts LSR2 thereby to de-energise the coil TLRA. The coil TLRA is of the kind that upon de-energisation operates its associated contacts after a predetermined time delay. Hence, the contacts TLRA1 will close a predetermined time after the coil LSR becomes energised. Energisation of the coil LSR also closes the contacts LSR1 so that when the sufficiently loaded car starts to move the contacts LRA4 close (the contacts LRA3 opening), the coil LSR remains energised through the contacts LRA4 and LSR1.

The circuit shown in Figure 7 is connected in that part of the motor circuit for the car A that initiates stopping of the car A to respond to landing calls that have been registered. The arrangement is such that if the circuit between the junction points JP1 and JP2 shown in Figure 7 is interrupted landing calls that have been registered will be ignored by the car. The point JP1 is connected with the point JP2 through the contacts MR2A2, the contacts LSR3 and a by-pass push-button PS located in the car A. Contacts COA2 are connected across the switch PS and series-connected contacts UX1 and DX1 are connected across the contacts LSR3 and the switch PS. Contacts UX1 together with UX2 and UXA are controlled by a relay coil (not shown) in the motor cicuit that is energised when the motor is connected to drive the car A upwardly. Contacts DX1 together with contacts DX2, DXA and DX3 are controlled by a relay coil (not shown) in the motor circuit that is energised when the motor is connected to drive the car A downwardly.

The circuit shown in Figures 3A and 3B operates as follows, it being supposed that the car A is at the lower despatching floor, and is next for despatch. Upon the occurrence of a landing call from an intending passenger at, say, the 6th floor who wishes to go downwards, the switch associated with the press-button 6D will be closed. The contacts CHA1 will initially be open as will the contacts A46. The closing of the switch at the 6th floor will cause the contacts L6D4 to be closed and will also, in the manner to be described hereinafter, eventually cause the coil A4 to be energised whereby the contacts A46 will close. If the system is on attendant operation the contacts COA3 will be closed so that a circuit will be made between the line L1 and the wire W11 (provided the car A is not on maintenance when contacts MR1A1 would be open). If the system is not on attendant operation the circuit will be made provided the contacts TRS3 are closed. These contacts become closed a predetermined period of time after the coil TRS is de-energised to close the car doors and such de-energisation, for the car that is next for despatch, occurs when the coil A4 is energised or when the despatch interval expires, whichever is the earlier. When the circuit it made between the wire W11 and the line L1 a circuit from L1 to L2 is completed through the contacts MR1A1, A46, COA3 (or TRS3), L6D4 and the coil 6DA. The contacts 6DA1 will therefore close and the coil UIA becomes energised through the circuit line L1, closed contacts 6DA1, junction point JP8, closed contacts UDS6, junction point JP9, contacts LDA2 and DIA1, coil UIA, contacts DRA1 and line L2. If the system is on automatic operation, the coil URA is also energised through the contacts COA5 and DRA1. On automatic operation, energisation of the coil URA causes the car A to move upwardly as soon as all doors associated with the car A have become closed. On attendant operation the upward movement of the car is initiated by closure of the switch UAA by the attendant, the coil URA becoming energised through contacts UAA2 and COA4 which latter are closed on attendant operation. Energisation of the coil URA is maintained (on attendant operation) whilst the car A is being driven, via the contacts UX2, since the attendant will release the switch UAA when the car A commences to move. As soon as the car A leaves the despatching floor the contacts CHA1 close so that the energisation of the coils 1UA to 7DA is no longer dependent upon closure of the contacts A46, TRS3 and COA3. Also when the car A leaves the despatching floor, if the system is not operating on a free car basis, the contacts ARA1 close as hereinafter described, whereby said one winding of the coil 2F becomes energised to register a second floor call so that the car A must eventually automatically return to the second floor. When the system is on downward despatch the contacts DSR7 are open and the contacts DSR6 are closed so that when the car is despatched from the 7th floor a call is automatically registered for the 7th floor by energisation of said one winding of the coil 7F. When the car that has been despatched from the second floor reaches the 6th floor the coil 6DA will be de-energised since as previously described, the contacts L6D4 controlled by the coil L6D will open. De-energisation of the coil 6DA causes the contacts 6DA1 to open. In travelling to the 6th floor the car will have opened the contacts UDS2 to UDS6 and have closed the contacts DDS2 to DDS5. The circuit through the coil UIA is therefore interrupted. For automatic operation the coil URA becomes de-energised when the coil UIA does, but on attendant operation the coil URA becomes de-energised whenever the car stops since in this case the contacts UX2 open. De-energisation of the coil UIA causes closure of the contacts UIA1 and a predetermined time after de-energisation of the coil URA, the contacts LUA2 (previously open) will close thereby placing the coil DIA (and the coil DRA for automatic operation) in a condition for energisation through the set of contacts 1UA1 to 5DA1 and 5UA1. The passenger at the 6th floor on entering the car presses the numbered button in the car corresponding to the floor to which he desires to travel, say, the 4th floor. The switch 4 is therefore closed and said one winding of the coil 4F becomes energised, whereby the contacts 4F1 and 4F3 are closed. The closing of the contacts 4F1 maintains said one winding of the coil 4F in the energised condition through the circuit line L1, wire W13, contacts 4F1, resistance R1, coil 4F and line L2. Closing of the contacts 4F3 causes energisation of the coil DIA when the contacts LUA2 close, via the circuit line L1, closed contacts 4F3, junction point JP6, contacts DDS4, junction point JP3, contacts LUA2 and UIA1, coil DIA, contacts URA1 and line L2. If the system is on automatic operation the coil DRA is energised at the same time as the coil DIA and the car A commences to move downwards immediately all car A doors have become closed. If the system is on attendant operation the coil DRA becomes energised through contacts DAA2 (closed by operation of the switch DAA) and contacts COA6, the circuit being held when the car moves away through the contacts DX2. When the car A arrives at the 4th floor contacts S4F are closed and said other winding of the coil 4F is energised to overcome the effect of the energisation of said one winding of the same coil so that the 4th floor call is cancelled. Hence the contacts 4F1 and 4F3 open. Provided the contacts ARA1 have closed subsequent to the departure of the car A from the despatching floor the coil DIA remains energised (as does the coil DRA for automatic operation) until the car has returned to the despatching floor, since closure of the contacts ARA1 automatically registers a second floor call and hence the contacts 2F1 and 2F3 will be closed and will remain closed until the car returns to the second floor. For automatic operation the car A must leave the 4th floor in a downward direction since the coils DIA and DRA will have remained energised whereby the coils URA and UIA cannot be energised since the contacts DRA1 are open. If the contacts ARA1 have not operated the car remains at the floor to which it is last called, i. e. in the present example, the fourth floor.

Assuming the car A is not on maintenance there is always a closed circuit between the points JP1 and JP2 (Figure 7) whenever the car A is stationary since in this case the contacts UX1 and DX1 are closed, and thus landing calls are always registered in the car motor circuit when the associated car is stationary. If the car A is loaded sufficiently to close the load switch LS the contacts LSR3 will open and when the car starts so that contacts UX1 or DX1 open, landing call stops already registered (but not car call stops) in the car motor circuit will be ineffective to stop the car, and any landing calls registered at the landings whilst the car is moving will be ineffective to stop the car. The car A will therefore ignore landing calls and respond only to car calls. The system is arranged thus because a loaded car can put passengers down at a landing but cannot take passengers on from a landing.

If the system is on attendant operation the contacts COA2 will be open and it is possible for the attendant, whilst the car is moving (i. e. contacts UX1 and DX1 open), to by-pass landing calls by opening the switch PS. When on automatic operation opening of the switch PS does not cause landing calls to be ignored as the contacts COA2 are closed.

When the system is on automatic operation, i.e. contacts COA3 are open, the contacts TRS5 serve to give priority to car calls (over landing calls) so far as setting the direction of movement of the car under despatch is concerned. If the car is at the despatching floor on up upward despatch (i.e. at the second floor) and is the first selected car, a passenger entering the car may wish to go either up or down. If there are landing calls outstanding at floors above the second and the passenger wishes to travel to the basement, operation of the switch 1 by the passenger causes energisation of the coil 1F and closure of the contacts 1F3 whereby the coils DIA and DRA will be energised and the car will become set for downward travel. As the contacts TRS5 are open until the car doors are about to close, none of the coils 3DA to 7DA can become energised until contacts TRS5 close.

On attendant operation the direction of movement of the car is under the control of the attendant since if he operates the up switch UAA the contacts UAA2 close and the coil URA is energised whereas if he operates the down switch DAA the contacts DAA2 close and the coil DRA is energised.

When the system is on automatic operation and the car A is a free car, i.e. it is standing idle at a floor other than the despatching floor, and its doors are closed, there will be no passenger within the car. Priority of setting the direction of movement of the car is given to an intending passenger arriving at the landing at which the free car is standing. Such priority is given over any landing call registered on the system while the doors are being opened to allow the passenger to enter the car and register a car call. This priority is brought about by the contacts TRS4, UIA5 and DIA5. As the car is away from the despatching floor the contacts A46 are open and landing calls can only be registered in the circuit of Figures 3A and 3B through the contacts CHA1 which are closed when the car A is away from the despatching floor. Immediately an intending passenger at the floor where the free car is standing, say the fifth floor, presses the 5D button to go down the circuit through the door opening coil DORA is completed via the switch 5DD and the contacts 5CDA which are closed as the car A is at the fifth floor. Energisation of the coil DORA when the car A is away from the despatching floor energises the coil TRS in a manner described later whereby the doors of car A open and contacts TRS4 open. There is therefore no closed circuit between the contacts CHA1 and the wire W11 whilst the doors are opening or open until the passenger has entered the car and registered a car call, for say the third floor. This will cause energisation of the coil DIA and closure of the contacts DIA5 whereby a circuit is established from contacts CHA1 to wire W11 and landing calls can subsequently be registered in the circuit of Figure 3A.

It will be understood that there are circuits like those of Figures 3 and 7 for each of the cars B and C and these two cars will have associated therewith up and down direction and selection coils URB, DRB, URC, DRC, UIB, DIB, UIC and DIC. These eight coils control contacts similar to those controlled by the coils URA, DRA, UIA and DIA but with the letter A in their references replaced by B or C as is appropriate.

*Free car*

In the auto-return circuit at the top of Figure 3A, one side of the auto-return relay coil ARA is connected to the line L2. The coil ARA controls contacts ARA1 to ARA5. Contacts ARA3 and ARA4 are not shown as they are in the auto-return circuits of cars B and C. The other side of the coil ARA is connected to a junction point JP42 which is connected through the contacts ARA2 to a junction point JP43. The junction point JP43 is connected through contacts CHA7 and the contacts MR2A3 to the line L1. The contacts CHA7 are controlled by the coil CHA which is energised when the car A is at the despatching floor. The point JP42 is also connected to the point JP43 through a traffic selection switch TFFS. This switch is manually closed for peak conditions when it is desired that the car A will always return to the despatching floor whereas under normal conditions the switch is open for operation on a free car basis. The point JP42 is joined through contacts DSR10 and 1UA6 to the line L1. The point JP43 is connected to a point JP44 through contacts UIA7. The point JP44 is connected to the point JP42 through three separate channels. The first of these three channels consists of contacts CHB8 and ARB3. The second channel consists of contacts CHC9 and ARC4 and the third channel consists of contacts SUA2. The contacts CHB8 are operated by a coil CHB that is energised when the car B is at the despatching floor. The contacts ARB3 are operated by the auto-return relay coil for the car B this coil corresponding to the coil ARA associated with car A. The contacts CHC9 are operated by the coil CHC that is energised when the car C is at the despatching floor. The contacts ARC4 are controlled by the auto-return relay coil for the car C. The contacts SUA2 are controlled by a coil SUA that is energised when there is a landing call in registration below the car A whilst the latter is away from the despatching floor.

When the switch TFFS is closed a car call is automatically registered for the despatching floor when the car A leaves the despatching floor, so that the car will eventually return to the despatching floor. This is brought about by the contacts CHA7 which close when the car A leaves the despatching floor whereby a circuit is established through the coil ARA from the line L1 through the contacts MR2A3 and CHA7, the switch TFFS, the coil ARA to the line L2. The coil ARA is thus energised and closes the contacts ARA1. This registers a car call for the despatching floor. The contacts ARA2 also close whenever the coil ARA is energised thereby to form a holding circuit for the coil ARA.

When the switches TFFS for all three cars are open the system operates in such a way that as the outstanding calls are cleared all cars except one return to the despatching floor, said one car remaining at the floor to which it is last called and thus forming a free car. When the system is on upward despatch and the car, say car A, is on an upward trip the contacts UIA7 are open so that the coil ARA cannot be energised. When the car reaches the top of its upward trip the contacts UIA7 close. Following upon this the car A will be auto-returned (the coil ARA will be energised) to the despatching floor (i) if there is a landing call outstanding below the car A in which case the contacts SUA2 will be closed or (ii) if neither or one (but not both) of the cars B and C has been auto-returned. If the car B has been auto-returned the contacts ARB3 will be open while the car B is returning to the despatching floor and the contacts CHB8 will open when the car reaches the despatching floor. Similarly either the contacts ARC4 or CHC9 will be open if the car C has been auto-returned.

If the system is on upward despatch the contacts DSR10 are closed and whenever a basement call is registered for the car A the contacts 1UA6 close and the coil ARA is energised so that the car must stop at the despatching floor after leaving the basement.

Whenever the car A returns to the despatching floor the auto-return coil ARA is de-energised by opening of the contacts CHA7. Similarly for cars B and C the coils ARB and ARC (not shown) are de-energised when the associated car returns to the despatching floor.

*Selection of kind of despatch*

The downward despatch coil DSR is connected in series with a switch TSS between the lines ML and EL (Figure 2C). The switch TSS has three positions one of which is appropriate to normal traffic conditions, another of which is appropriate to up peak traffic and the third of which is appropriate to down peak traffic. The switch TSS has three poles TSS1, TSS2 and TSS3. The pole TSS1 is connected to the main line ML and the pole TSS3 is connected to the coil DSR. When traffic conditions are normal the switch is placed in a position in which the pole TSS1 is connected to neither of the poles TSS2 and TSS3. During up peak the switch is positioned so that the pole TSS1 is connected to the pole TSS2. In neither of these two positions, i. e. normal and up peak, is the coil DSR energised. For down peak conditions the system is placed under downward despatch by positioning the switch TSS so that the pole TSS1 is connected to the pole TSS3 whereby the coil DSR is energised. The coil DSR controls contacts DSR1A to DSR9A, DSR1B to DSR9B, DSR1C to DSR9C, DSR3U, DSR3D, DSR4D and DSR5 to DSR11.

If desired the switch TSS may be controlled by a clock. For example, if the left system is in an office block the clock may be arranged to position the switch TSS in the up peak position for the period in which the majority of employees are arriving at their offices, in the down peak position when the majority are departing from their offices and in the normal position at other times. When the night service switch SW is ganged with the switch TSS the clock would also be arranged to close the switch SW during a night period.

*Selection of order of despatch of cars*

The circuit shown in Figure 2B contains three identical portions, one appropriate to each of the cars A, B and C. Only the references differ as between the three portions and hence only the portion associated with the car A will be described in detail, it being understood that corresponding elements in the portions associated with the cars B and C are similarly referenced, the letters A, B and C in the references being interchanged as appropriate.

A line W14A is connected through contacts FRA2 and MR3A4 to the main line ML. The contacts FRA2 are closed when the field winding of the motor driving the car A is energised and the contacts MR3A4 are closed unless the maintenance switch MSA is closed. Contacts COA8 are connected across the contacts FRA2, the contacts COA8 being closed when the system is on automatic operation. A wire W15A is connected to the earth line EL through contacts MR3A5 which are closed unless the maintenance switch MSA is closed.

One side of the coil CHA is connected to the wire W15A. The other side of this coil is connected to a junction point JP45 through the contacts DSR1A and CHAU, and also through contacts DSR2A and CHAL. The point JP45 is connected to the wire W14A through contacts UAA4, DAA4 and DCRA5. The contacts CHAU are only closed when the car A is at the upper despatching floor (7th floor) and the contacts CHAL are only closed when the car A is at the lower despatching floor (2nd floor). The contacts UAA4 are opened by the attendant when the up switch UAA is operated, the contacts DAA4 only open when the attendant operates the down switch DAA and the contacts DCRA5 only open when a door close switch DCSW in the car A is operated. The coil CHA controls contacts CHA1 to CHA11.

A first selected car relay coil A1 which controls contacts A11, A12 . . . A19, A110, A111, A112, A113, A114 and A115, has one side thereof connected to the wire W15A. The coil A1 is of the kind that operates its contacts immediately upon energisation but upon de-energisation operates the contacts after a time delay. A second selected car relay coil A2 that controls contacts A21, A22 (Figure 2B) and A23 (Figure 3A) has one side thereof connected to the wire W15A. The coil A4 that gives the despatch signal for the car A has one side thereof connected to the wire W15A and this coil controls contacts A41 to A46, A49, A410, A411 and A412. The other side of the coil A1 is connected through contacts C14 and B16 to a junction point JP10. The junction point JP10 is connected through contacts C21 and B22 to a junction point JP11 which is joined through contacts CHA2 and DRA8, to the wire W14A. The junction point JP10 is also connected through contacts A41 to a junction point JP12. The other side of the coil A2 is connected through contacts A12 to the junction point JP12 and this is connected through contacts A11 to the junction point JP11. The other side of the coil A4 is connected to a junction point JP13 which is joined via contacts TA31 to a junction point JP14. The latter junction point is connected through contacts SCRA to the junction point JP11. The contacts SCRA and their counterparts SCRB and SCRC are controlled by a service call relay coil SCR (Figure 2C). The junction point JP13 is also connected to the junction point JP14 through contacts A42, C44 and B45. Junction point JP14 is connected via contacts A13 to the junction between the contacts C44 and A42. The point JP13 is in addition connected to the point JP11 via the contacts TLRA1.

One side of a time despatch relay coil TA3 that controls the contacts TA31 and contacts TA32 is connected through a time delay circuit CTA to the wire W15A. The circuit CTA includes contacts TSRA (normally open) which when closed shorten the delay period of the circuit CTA. The contacts TSRA and their counterparts TSRB and TSRC are controlled by a time shortening relay coil TSR (Figure 2C). The other side of the coil TA3 is connected through contacts A43, C15 and B17 to the wire W14A. A point between the coil TA3 and the contacts A43 is joined via the contacts TA32 and a coil AR to the wire W15A. The coil AR controls contacts AR1 (Figure 3A), AR2 and AR3 (which are in the basement circuits of cars B and C and are consequently not shown) and AR4 and AR5 (Figure 6).

The circuitry of Figure 2B that has so far been described operates to select the next car for despatch. If all three cars are at the despatching floor and provided none of the attendant up and down switches UAA and DAA and the door close switch DCSW has been operated the coils CHA, CHB and CHC will be energised and the contacts CHA2, CHB2 and CHC2 will be closed. The contacts DRA8, DRB8, DRC8 will be closed unless the associated car is set for downward travel and is therefore not available for selection. The contacts FRA2, FRB2 and FRC2 will be closed if the field windings of all three electric motors are energised, these windings being continuously energised when the system is on attendant operation. On automatic operation the contacts COA8, COB8 and COC8 are closed. For upward despatch the contacts CHAL, CHBL and CHCL will be closed by the cars A, B and C and the contacts DSR2A, DSR2B and DSR2C will be closed whereby the coils CHA, CHB and CHC are energised. For downward despatch the cars A, B and C will be at the upper despatching floor and the contacts CHAU, CHBU and CHCU will be closed as will the contacts DSR1A, DSR1B and DSR1C since in this case the switch TSS will be at the position which causes the coil DSR to be energised. One of the coils A1, B1, C1 will be energised. The one which is energised, say, A1, prevents B1 and C1 from becoming energised since the contacts A14 and A16 in series with these two coils will be open. The coil A2 cannot be energised since the contacts A12 will be open. The contacts B11 and C11 will be open since neither B1 nor C1 is energised. The coils B2 and C2 are both momentarily in a closed circuit, the former through the contacts MR3B4, COB8 or FRB2, DRB8, CHB2, A21, C22, B41, B12 and MR3B5, and the latter through contacts MR3C4, COC8 or FRC2, DRC8, CHC2, A22, B21, C41, C12 and MR3C5. The coil B2 controls the contacts B21 in the circuit of coil C2 and the coil C2 controls the contacts C22 in the circuit of the coil B2. Whichever of the pairs of contacts B21 and C22 opens first causes the coil in the associated circuit to be de-energised, the other coil remaining energised. Assume that the coil B2 remains energised, that is to say, that the contacts B21 are open and hence the coil C2 cannot at this stage be energised. The coils TB3 and TC3 cannot be energised since the contacts A15 and A17 are open. However, the contacts B17, C15 and A43 in series with the coil TA3 are closed and hence the circuit through the coil TA3 and the time delay circuit CTA is closed. The despatch interval for the car A is determined by the circuit CTA and this interval commences as soon as a circuit is completed through the series connected contacts B17, C15 and A43. At the conclusion of the interval the coil TA3 operates the contacts TA31 and TA32. The coil A4 is placed in a condition for operation dependent only on the closing of the contacts SCRA. The coil AR is energised by the closing of the contacts TA32. Immediately a landing call necessitates the departure of a car from the despatching floor the coil SCR is energised (in a manner described later) so that the contacts SCRA, SCRB and SCRC close. The coil A4 is therefore energised and a despatch signal is given to the car A. On attendant operation the despatch signal is a visual one given to the attendant, whereas on automatic operation there is no visual signal, the operation of the coil A4 opening the contacts A49 in the door closing circuit whereby closing of the car doors is initiated (unless they are already closed) and closing the contacts A46 to set the appropriate direction coil URA or DRA as hereinbefore described and start the car. The coils B4 and C4 cannot be energised since the coils TB3 and TC3 are not energised so that the contacts TB31 and TC31 are open. Furthermore, the doors of cars B and C are closed at this stage, for automatic operation, so that no loading of these cars can occur to cause closure of the contacts TLRB or TLRC. Since the coil B2 is energised, the coil A1 was energised through the contacts A41 and A11. As soon as A4 becomes energised, however, the contacts A41 open so that A1 is then de-energised. The coil A2 cannot be energised but the coil A4 remains energised through the now closed contacts A42 and the contacts C44 and B45. The coil A4 remains energised until the car A leaves the despatch floor (until the contacts CHA2 open), or until a despatch signal is given to one of the other two cars (contacts B45 or contacts C44 open). Assuming that the car A is despatched in response to the despatch signal, the coil A4 will become de-energised through the opening of the contacts CHA2. The contacts A15 close a predetermined time after the opening of the circuit through the coil A1 and the despatch interval for the car B commences since the circuit through coil TB3 becomes closed through closed contacts A15, C17, B43 and the circuit CTB. The closing of the contacts A14 (following de-energisation of the coil A1) energises the coil B1 since as none of the coils A2, C2 and C1 is energised, the contacts A21, C22 and C16 are closed. This closes the contacts B11 so that the coil B1 is then in a closed circuit through the contacts B11, B41, A14 and C16. The coil B2 becomes de-energised since the contacts B12 open. The de-energisation of the coil B2 closes the contacts B21 so that the coil C2 becomes energised, and the car C becomes the second selected car, the car B being the first selected car now awaiting a signal for despatch. If the coil SCR is in an energised condition at the conclusion of the despatch interval for the car B the coil B4 will be energised and the despatch signal will be given to the car B. The coil B1 will become de-energised as will the coil C2, and the coil C1 will become energised so that the car C becomes the first selected car. Following de-energisation of the coil B1 the despatch interval for the car C commences and if at the conclusion of this period the coil SCR is in an energised condition the despatch signal will be given to the car C by the energisation of the coil C4. When the car C leaves the despatching floor the contacts CHC2 will be open, coils C4 and C1 will become de-energised and assuming the cars A and B have left the despatching floor, the timing interval for the cars A, B and C will commence since circuits are then closed through the coil TA3 and circuit CTA, through the coil TB3 and circuit CTB, and through the coil TC3 and the circuit CTC. The coil C1 remains energised after the coil C4 has become energised since at this time neither of the coils A2, B2 is energised so that the circuit through the coil C1 is maintained through the contacts A22 and B21 and is not dependent upon the contacts C41 remaining closed. Since none of the selected car relay coils A1, A2, B1, B2, C1 and C2 nor any of the despatch relay coils A4, B4, C4 is energised the first selected car relay coils A1, B1, C1 are in a condition for operation dependent upon the return of the associated car to the despatching floor. Upon the arrival of a car at the despatching floor the associated first selected car relay coil, say, B1 becomes energised and the despatch interval timing circuits of the cars A and C are interrupted through the opening of the contacts B17 and B15 whereas the arrival of the car B at the despatching floor has no effect on the despatch interval for the car B. If the despatch interval has already expired before the car B arrives at the despatching floor, the arrival of the car will immediately place the despatch signal coil B4 in a condition for operation dependent upon energisation of the service call relay coil SCR. If, however, the time interval has not expired the coil B4 can only become energised after the expiry of the remaining portion of the despatch interval and then only if the coil SCR is energised. The next car to arrive at the despatching floor becomes the second car for despatch and the coil A2 or C2 will become energised depending upon whether it is the car A or C that arrives at the despatching floor. It will be seen, therefore, that during operation the cars are selected for despatch in an order depending on the order in which they arrive at the terminal floor and the despatch interval for each car is initiated when the previously selected car ceases to be the first selected car. When starting up the lift system, with all cars at the despatching floor, the selection order is determined, upon closure of the switches MS, by the speed at which the contacts associated with the selector coils close.

Energistration of the despatch relay coils A4, B4 or C4 of the first selected car to give the despatch signal to the associated car can occur before the expiry of the despatch interval. This takes place if the load switch LS becomes closed as a result of the entry of a sufficient number of passengers. Closure of the switch LS causes de-energisation of the associated coil TLRA, TLRB or TLRC and closing of the contacts TLRA1, TLRB1, or TLRC1 as the case may be.

If the first selected car, say A, is driven away before the expiry of its despatch interval, the coil A1 will be de-energised and the second selected car, say B, becomes the first selected car and the coil B1 becomes energised following closure of the contacts A14. The commencement of the despatch interval for the car B follows upon de-energisation of the coil A1 as the contacts A15 close.

*Shortened despatch interval*

Referring now to Figure 2C, the time shortening relay coil TSR has one side thereof connected to the earth line EL. The other side of the coil TSR is connected to a junction point JP46 which is connected by three parallel paths to a junction point JP15. One of these paths consists of contacts MR3A6, CHA11 and MR3A7, the second path consists of contacts MR3B6, CHB11 and MR3B7, and the third path consists of contacts MR3C6, CHC11 and MR3C7. The point JP15 is joined through series connected normally open contacts MR1A8, MR1B8 and MR1C8 to the main line ML. The junction point JP15 is also connected to the line ML through normally closed series connected contacts MR1C10, C412, UIC4, MR1C9, MR1B10, B412, UIB4, MR1B9, MR1A10, A412, UIA4 and MR1A9. Selector contacts SELA, SELB and SELC are respectively connected across the series connected pairs of contacts UIA4 and A412, UIB4 and B412 and UIC4 and C412. The contacts SELA, SELB and SELC are respectively operated by the cars A, B and C to close when the associated car is above a predetermined floor, say the 4th floor. The contacts MR1A8 bridge the series-connected contacts MR1A9, UIA4, A412 and MR1A10, the contacts MR1B8 bridge the series-connected contacts MR1B9, UIB4, B412 and MR1B10, and the contacts MR1C8 bridge the series-connected contacts MR1C9, UIC4, C412 and MR1C10. The junction point JP46 is also connected to the pole TSS2 of the switch TSS, this pole being connected to the line ML via contacts DSR3. When the switch TSS is in the position for up peak traffic the point JP46 is connected to the line ML through the switch TSS and the coil TSR is continuously energised whereby the despatch interval is reduced to the shortened period. Similarly when the switch TSS is set for down peak traffic the coil DSR is energised whereby the contacts DSR3 are closed and the coil TSR again remains continuously energised so that the despatch interval is reduced to the shortened period. When, however, the switch TSS is positioned for normal traffic conditions energisation of the coil TSR depends on the position of the cars, their selected direction of travel and whether they are under despatch. If all the cars A, B and C are at the despatching floor the contacts CHA11, CHB11 and CHC11 will be open so that the time shortening relay coil TSR cannot be energised whereby the despatch interval will be of the longer period. As soon as one of these cars becomes under despatch the contacts A412, B412 or C412 as the case may be will be open and when the car leaves the despatching floor the contacts CHA11, CHB11, CHC11 as the case may be will close to establish a closed circuit between the points JP46 and JP15. Opening of the contacts A412, B412 or C412 has, however, broken the circuit between the point JP15 and the line ML so that the coil TSR remains de-energised. Whilst the despatched car is on an upward trip but is at or below the 4th floor the corresponding set of contacts UIA4, UIB4 or UIC4 will be open and the coil TSR will remain de-energised so that the despatch interval will be of the longer (normal) duration. When, however, the upward travelling car, say, A, is above the 4th floor, the contacts SELA will close across the series-connected open contacts UIA4 and the now closed contacts A412, and the coil TSR will be energised thereby reducing the despatch interval for the next selected car to a shorter period. Similarly, if two or three cars are on an upward trip and all cars that are on a trip are above the 4th floor, the despatch interval is reduced to a shorter period, but if one of the cars that is on an upward trip is at or below the 4th floor, the despatch interval will be of normal duration. When cars not at the despatching floor are moving downwardly the associated contacts UIA4, UIB4 or UIC4 as the case may be, will be closed and the despatch interval will be shortened, provided there is no other car under despatch, or on an upward trip and not above the 4th floor.

If any one of the cars A, B or C is placed under maintenance and the associated switch MSA, MSB or MSC is closed the contacts MR1A8, MR1B8 or MR1C8 as the case may be will be closed and the contacts MR3A6 and MR3A7, or MR3B6 and MR3B7, or MR3C6 and MR3C7 as the case may be will be opened. Thus the effect of operation of the selector contacts, despatch coil contacts and up direction contacts associated with the car under maintenance will be cancelled so far as affecting de-energisation of the coil TSR is concerned.

*Routing selectors*

Reverting now to Figure 2B, one side of the up routing relay coil SUA is connected to the wire W15A. The other side of this coil is connected to a junction point JP16. The junction point JP16 is connected to the wire W14A through series connected contacts 3UA2 and UR3A, through series connected contacts 4UA2 and UR4A, through series connected contacts 5UA2 and UR5A, through series connected contacts 6UA2 and UR6A, through series connected contacts DSR3A, 2UA2 and UR2A, and through series connected contacts DSR3A, 1UA2 and UR1A. All these contacts are normally open. The contacts UR1A to UR6A are controlled by the car A, the contacts UR3A closing when the car moves upwardly from the 3rd floor, the contacts UR4A closing when the car moves upwardly from the 4th floor and so on, the contacts below the car remaining closed.

One side of a down routing relay coil SDA is connected to the wire W15A and the other side of this coil is connected to a junction point JP17. The junction point JP17 is connected to the wire W14A through series connected contacts DSR7A, 2DA2, DR2A, through series connected contacts 3DA2 and DR3A, through series connected contacts 4DA2 and DR4A . . . and through series connected contacts DSR4A, 7DA2 and DR7A. The contacts DR2A to DR7A are operated by the car A. The contacts DR2A are open when the car A is at or above the 2nd floor. The contacts DR3A are open when the car is at or above the 3rd floor and so on.

The circuits appropriate to the cars B and C have similar up and down routing relay coils SUB, SDB, SUC, and SDC which are associated with similar sets of contacts 1UB2 to 6UB2 and UR1B to UR6B, 2DB2 to 7DB2 and DR2B to DR7B, 1UC2 to 6UC2 and UR1C to UR6C, and 2DC2 to 7DC2 and DR2C to DR7C.

The contacts associated with the routing coils SUA, SUB, SUC control the energisation of these coils in such a way that in general if an upward direction landing call is given at a floor below the level of a car the upward routing coil appropriate to that car will be energised, and if a downward landing call is given at a floor that is above the car the downward routing coil for that car will be energised. For example, if the car B is at the 4th floor the contacts UR1B, UR2B, and UR3B and DR5B, DR6B and DR7B will be closed whereas the contacts UR4B to UR6B and DR2B, DR3B and DR4B will be open. An upward call from, say, the 3rd floor will cause the contacts L3U4 (Figure 3A) to close and the relay coil 3UB will ordinarily be energised whereby inter alia the contacts 3UB2 will be closed and hence a circuit through the coil SUB will be made through the closed contacts 3UB2 and UR3B and hence the coil SUB will be energised. An upward call, however, from, say, the 6th floor which will cause closing of the contacts 6UB2 will not cause energization of the coil SUB since the contacts UR6B will still be open. A downward call from the 6th floor however, would energise the coil SDB since the contacts 6DB2 would close and the contacts DR6B would still be closed. A downward call, however, from the 3rd floor would have no effect on the coil SDB since although the contacts 3DB2 would close the contacts DR3B would be open.

The contacts DSR3A, DSR4A, DSR7A, DSR3B, DSR4B, DSR7B, DSR3C, DSR4C and DSR7C are provided in the routing circuits for preventing energisation of the routing coils as a result of landing calls from a despatching floor and from the basement (1st floor) when the system is on upward despatch.

*Service call circuit*

Referring again to Figure 2C, it will be seen that one side of the service call relay coil SCR that controls the contacts SCRA, SCRB, SCRC (Figure 2B) and SCRA1 (Figure 3A) and SCRB1 and SCRC1 (not shown), is connected to the earth line EL and the other side is connected to a junction point JP21. One contact of each of the pairs LDX1 and LUX1 is connected to the main line ML. The other contact of each of these pairs is connected to a junction point JP18. Between the junction points JP18 and JP21 are three series connected circuits appropriate one to each of the cars A, B and C. For convenience these circuits are herein termed "car A service circuit," "car B service circuit" and "car C service circuit." The car A service circuit is connected between the point JP18 and a junction point JP19, the car B service circuit is connected between the junction point JP19 and a junction point JP20, and the car C service circuit is connected between junction point JP20 and the junction point JP21. The three circuits are identical. Only the car A service circuit will therefore be described, it being understood that the corresponding elements in the car B and car C service circuits are referenced similarly to those of the car A service circuit, but with the letter A replaced by B or C as appropriate. In the car A service circuit there are ten parallel connected channels that can be completed between the junction points JP18 and JP19. There are in fact eleven channels but one can never be completed as it always has a pair of closed DSR contacts in series with a pair of open DSR contacts. The first of said ten channels consists of normally open contacts MR1A5. The 2nd to 10th channels have at the ends thereof and common to all of the nine channels normally closed contacts MR1A6 and MR1A7. The second channel includes normally open contacts CHA3 and a third channel includes normally open contacts COA11 and normally closed contacts FRA3. The fourth channel consists of normally open contacts LUX2A, normally closed contacts DSR5A and normally open contacts SUA1. The fifth channel consists of normally open contacts UIA6, DSR6A and LDX2A. The sixth channel consists of the normally open contacts UIA6 (just mentioned) and SUA1 (just mentioned). The seventh channel consists of normally open contacts LDX3A, DSR8A and SDA1. The eighth channel includes normally open contacts DIA4, normally closed contacts DSR9A and normally open contacts LUX3A. The ninth channel consists of the normally open contacts DIA4 (just mentioned) and SDA1 (just mentioned). The tenth channel includes normally open contacts TPA2 that are controlled by a time pass relay coil TPA. This coil has one side connected through a time delay circuit CTPA to the wire W15A and the other side connected to a wire W14B via normally closed contacts CHA4, UXA and DXA. The wire W14B is connected to the main line ML through parallel connected normally open contacts ARA5, ARB5, ARC5, LUX4 and LDX4. Thus if any car has been auto-returned but has not yet reached the despatching floor or if there is an outstanding landing call (other than for the despatching floor or for the basement when on upward despatch), the wire W14B will be connected to the main line ML. If the car A is at the despatching floor the contacts CHA4 are open and the coil TPA cannot be energised. If the car A is in motion contacts UXA or DXA will be open and hence the coil TPA cannot be energised. If, however, the car A is stationary at any position other than the despatching floor and if a connection exists between the wire W14B and the line ML, the circuit through the coil TPA is closed and this coil will open its associated contacts TPA1 (Figure 2A) and close its associated contacts TPA2 (Figure 2C) after a delay period.

The service call relay coil SCR is energised to give a service call to the despatch circuits whenever there is one closed channel in each of the three car service circuits and provided the contacts LUX1 or LDX1 are closed. In normal operation of the three cars the three maintenance switches MSA, MSB and MSC are open and hence the contacts MR1A5, MR1B5 and MR1C5 are open. The first channels therefore are ordinarily in an open condition. The field windings of the three motors are ordinarily continuously energised during attendant operation of the lift system so that contacts FRA3, FRB3 and FRC3 are open and when on automatic operation the contacts COA11, COB11 and COC11 are open, and hence the third channels are always open except when the system is on attendant operation and the field winding of the associated car is not energised. If all three cars are at the despatching floor the coils CHA, CHB and CHC will be energised and the contacts CHA3, CHB3 and CHC3 will be closed. Hence any landing call that energises either the coil LUX or LDX to close the contacts LUX1 or LDX1 will cause the service call relay coil SCR to be energised to transmit a service call to the despatch circuits. If, however, one of the cars is away from the despatching floor, say, the car C, the coil SCR will then only be energised if there is a closed circuit through one of the 4th to 10th channels appropriate to the car C. When car C is away from the despatching floor it is either a stationary free car or it is on a trip. When it is a free car and the system is on upward despatch a landing call occurring above the car is attended to by the free car and it will be found that none of the fourth to tenth channels for the car C can be completed unless the car C fails to leave the floor at which it was the stationary free car in which case after the expiry of a time limit contacts TPC2 will close so that a service call occurs and another car is despatched. If on up despatch the landing call occurred below the free car and was an up call the free car does not attend to the call and the fourth channel is completed (contacts LUX2C closing for an up call and contacts SUC1 closing for an up call below the car) whereby another car is eventually despatched. At the same time the free car will be returned to the despatching floor due to closure of the contacts SUC2 (not shown) in the auto-return circuit of the car C. Had the call below the free car been a down call, the free car attends to the call and none of the fourth to tenth channels can be completed. If the car C is not a free car but is on an upward trip the contacts UIC6 will be closed and the contacts DIC4 will be open and hence the 8th and 9th channels of the car C service circuit cannot be closed. If the system is operating on upward despatch the coil DSR is unenergised and hence the contacts DSR6C and DSR8C will be open and the 5th and 7th channels cannot be closed. If a call is made from a floor above the upward travelling car C, the car C can obviously attend to the call either on the up or return part of its trip and hence the landing call should not result in a service call. As previously explained, if an upward call occurs from a landing above the car the corresponding upward routing coil SUA, SUB or SUC will not be energised and hence in this case the contacts SUC1 in the 4th and 6th channels remain open. When a downward call occurs above the car the contacts SDC1 close but this has no effect as the 7th and 9th channels in which these contacts occur are maintained open by other contacts as mentioned above. If, however, there is an upward landing call below the upward travelling car C, the contacts SUC1 will become closed and the 4th and 6th channels will be completed whereby the coil SCR will be energised. A down call below the car has no eeffct on the 4th and 6th channels which therefore remain open. The car can deal with this call on its return trip. Should the system be operating on downward despatch the contacts DSR6C and DSR8C will be closed and DSR5C and DSR9C will be open whereby the 4th and 8th channels cannot be completed. If there is then a downward landing call the contacts LDX2C will close and provided the car C is on an upward trip the contacts UIC6 remain closed so that the 5th channel will be closed whereby a service call will be initiated. When the car is on a downward trip a service call can only be initiated through the 4th, 7th, 8th or 9th channel since in this case the contacts UIC6 will be open whilst the contacts DIC4 will be closed. In this case, when the system is operating on downward despatch the contacts DSR5C and DSR9C will be open and the 4th and 8th channels cannot be completed. A service call can then only be initiated through the 7th or 9th channel and this occurs when a downward landing call is made from a floor that is above the downward travelling car C, i. e. the contacts SDC1 are closed. When operating on upward despatch the 7th channel cannot be completed so that the 4th, 8th and 9th channels remain available for completion. The 4th channel is completed by an up call below the car, the 8th channel by an up call and the 9th channel by a down call above the car. If the car is on a trip and becomes delayed at a floor beyond a predetermined time, the con-contacts TPC2 will close so that the 10th channel is closed and a service call is made for another car to attend to the landing call and any others that happen to be registered.

A service call is, of course, only required when a landing call cannot be attended to by a car that is already on a trip or by a free car. If a car already on a trip or a free car cannot attend to a landing call one of the channels of the portion of the service coil circuit appropriate to that car will be completed. If one of the channels is completed for each of the cars a circuit will be completed through the three series connected car service circuits and hence the service coil will be energised when a landing call is made. The circumstances in which a car cannot promptly attend to a landing call without undergoing despatch are as follows:

(1) The car is on maintenance.
(2) The car is at the despatching floor.
(3) When on attendant operation the field windings of the motor that drives the car are not energised.
(4) On upward despatch (i. e. the cars return downwardly to the 2nd floor) an up call occurs below the car.
(5) On downward despatch (i. e. cars return to 7th floor) the car is set for upward travel and a down call occurs.
(6) The car is set for upward travel and an up call occurs below the car.
(7) On downward despatch a down call occurs above the car.
(8) On upward despatch an up call is made when the car is set for downward travel.
(9) A down call occurs above the car when set for down travel.
(10) The car is delayed at a floor other than the despatching floor.

Circumstances 1 to 10 correspond to the channels 1 to 10 respectively.

The overall effect is that a service call arises when any one of the following conditions prevails:

(a) When any "up" or "down" landing call is registered and all the cars are at the despatching floor.
(b) Whilst despatching from the lower terminal floor, when an "up" landing call is registered for a floor that is below the lowest upward travelling car or below a free car.
(c) Whilst despatching from the upper terminal floor, when a "down" landing call is registered for a floor that is above the highest downward travelling car.
(d) Whilst despatching from the lower terminal floor, when a "down" landing call is registered for a floor that is above the highest downward travelling car, provided no other car is travelling up.
(e) Whilst despatching from the upper terminal floor, when an "up" landing call is registered for a floor that is below the lowest upward travelling car, provided no other car is travelling down.
(f) Whilst despatching from the lower terminal floor, when an "up" landing call is registered if any number of cars are travelling down, providing there is no upward travelling car.
(g) Whilst despatching from the upper terminal floor, when a "down" landing call is registered if any number of cars are travelling up, provided there is no downward travelling car.

When a landing call is made by depression of one of the buttons 1U to 7D (excluding those at the despatching floor and at the basement except when on downward despatch) the appropriate one of the relays LUX or LDX will be energised depending upon whether the intending passenger desires to travel up or down. One of the pairs of contacts LUX1, LDX1 will be energised and if no car already on a trip is capable of attending to the call a circuit will be completed through each of the three series connected car service circuits and the service call relay coil SCR will be energised. This will place the despatch coil A4, B4 or C4 as the case may be of the first selected car in a condition for operation and either upon closure of the associated load switch LS or upon the expiry of the despatch interval, the appropriate despatch coil will be energised to give a despatch signal to the first selected car. The despatch interval for the first selected car will have been initiated when the previously selected car ceased to be the first selected car.

When the despatch signal is given to the first selected car the appropriate one of the coils 1UA to 7DA, 1UB-7UB and 1UC to 7UC becomes energised consequent upon closure of the contacts A46 (or B46 or C46) and TRS5 (unless contacts COA3 are closed) and the direction selection coil UIA, DIA, UIB, DIB, UIC, DIC as appropriate is energised. Following despatch of the car it will be found that all ten channels of the despatched car are open so that the service call circuit is interrupted whereby the coil SCR is de-energised.

After the despatch signal is given to the first selected car, the second selected car, namely, that which had the coil A2, B2 or C2 energised becomes the first selected car, the latter coil being de-energised and the first selected car coil of this car becoming energised. The despatch interval for this car commences a predetermined time after the previously selected car ceased being the first selected car.

Basement operation

The basement circuits of the three cars are the same and hence only that of car A will be described.

A junction point JP30 (Figure 3A) between the previously mentioned contacts DSR5 and L1U4 is connected to a junction point JP31 through the contacts DSR8. The junction point JP30 is also connected via the contacts CON4 to the wire W11. The junction point JP31 is connected to a wire W17 via five parallel channels. The wire W17 is joined to the junction point JP23. The first channel consists of series-connected contacts MR1C12 and MR1B11. The second channel consists of contacts 1UA5. The third channel consists of series-connected contacts 1UC4, 1UB3, DX3 and CHA5. The fourth channel consists of series-connected contacts 1UC4, 1UB3, CR3, BR2, AR1, URA8 and SCRA1. The fifth channel consists of series-connected contacts 1UC4, 1UB3, CR3, BR2 and A23. The contacts 1UC4 and 1UB3 are common to the third, fourth and fifth channels and the contacts BR2 and CR3 are common to the fourth and fifth channels.

The service to calls originating from the basement is supervised as follows. When the lift system is on night service the contacts CON4 will be closed and the basement landing calls are treated in the same way as any other landing call. (It is to be understood that when on night service the contacts CHA1 remain permanently closed since the despatcher circuitry of Figures 2B and 2C cannot be energised as the contacts CON1 will be open, whereby the coil CHA cannot be energised.) When not on night service but with the despatcher system on downward despatch, i. e. the 7th floor is the despatching floor, the basement landing calls are treated in the same way as landing calls from any of the 2nd to 6th floors since the contacts DSR5 will be closed and the contacts DSR8 open. When, however, the system is operating on upward despatch, i. e. the second floor is the despatching floor, the coil 1UA can only be energised by a landing call from the basement if there is a closed circuit through one of the five channels associated with the point JP31. It is to be understood that the circuit of the motor that drives the car A can only cause the car A to proceed to the first floor if the coil 1UA is energised. The first channel will be closed if both of the cars B and C are taken out of service for maintenance purposes, i. e. the switches MSB and MSC are closed whereby the contacts MR1B11 and MR1C12 close. The second channel is a holding circuit for the coil 1UA and hence only becomes completed (on upward despatch) after one of the other four channels is completed. The contacts IUB3 and 1UC4 are operated by coils (not shown) which correspond to the coil 1UA, in the motor circuits of the cars B and C. The contacts 1UB3 and 1UC4 are closed when their associated coils are deenergised and are open when the coils are energised. These contacts supervise the 3rd to 5th channels of the basement circuit of the car A and prevent these three channels being completed if a basement call is registered for either of the cars B and C. Provided the contacts 1UB3 and 1UC4 remain closed the third channel is completed when the car A arrives at the second floor in a downward direction since in this case the contacts CHA5 and DX3 will be closed. The 4th and 5th channels are additionally supervised by the contacts BR2 and CR3. Neither of these contacts are open unless (a) the despatch interval for either of the cars B and C has expired and that car is the first selected car, or (b) no car is at the terminal floor. The case (b) where there are no cars at the terminal floor is not relevant to a consideration of the 4th and 5th channels since the basement landing call will be attended to by the first car that returns to the second floor, since the 3rd channel of the basement circuit of this car will be closed. The car B or the car C will only be the first selected car for basement service if the despatch interval has expired and if there is no car call in registration and if there is no service call existing for this car. There is hence an idle car B or C at the despatching floor available for immediate despatch and it will be this car that serves the basement. If the car A is the first selected car and its despatch interval has expired, the contacts AR1 will be closed, and the 4th channel will be completed provided there is no landing call in registration from floors 3 to 7 (since this would cause contacts SCRA1 to open) and provided no car call is in registration to move car A upwardly (since in this case the contacts URA8 would be open). The contacts A23 close when car A is the second selected car and hence the 5th channel can be completed if the car A is at the second floor and is the second selected car, provided the despatch interval has not yet expired for the first selected car (which will be the car B or C). It will be seen, therefore, that with all three cars in operation a call for basement service is attended to either by the first selected car upon which the despatch interval has expired, or by the second selected car if the despatch interval has not expired on the first selected car, or by the first car to return downwardly to the second floor. It is to be understood, of course, that two cars cannot simultaneously proceed to the basement as the result of a landing call from the basement owing to the supervisory nature of the contacts in the 3rd to 5th channels, which contacts are controlled by the coil 1UA and the corresponding coils in the motor circuits of the cars B and C.

*Call registered indication*

The primary winding of a transformer T1 (Figure 4) is connected via fuses F3 to an alternating current source S1. One side of the secondary winding of the transformer T1 is connected to a wire W18 and the other side of the secondary winding is connected to a wire W19. One contact of each of the pairs L1U3, L2D3, L2U3 . . . L6U3, L7D3 is connected to the wire W18. The other contacts of these pairs are respectively connected through call registered signal lamps CRSU1, CRSD2, CRSU2 . . . CRSU6 and CRSD7 to the line W19. The contacts L1U3 to L7D3 it will be recalled are closed when the coils L1U to L7D (Figure 2A) are energised in response to landing calls. Hence momentary pressing of a landing call push-button causes the corresponding call registered signal lamp to be illuminated to indicate to the intending passenger that the call is receiving attention by the system. The lamps CRSU1 to CRSD7 are located at the appropriate floors in the push-button boxes 1PB to 7PB.

*Visual and aural indicators associated with each car*

Since the sets of visual and aural indicators for the three cars are identical, only the set associated with car A will be described.

The primary winding of a transformer T2 (Figure 5) is connected via fuses F4 to an alternating current supply S2, there being a pair of contacts MR2A1 in one of the wires leading to the primary winding. Wires W20 and W21 lead to one side of the secondary winding and wires W22 and W23 lead to the other side of the secondary winding. A rotary switch RS having a rotary arm RSA and seven contacts RS1 to RS7 has one end of the movable arm connected to the wire W21. The free end of the arm RSA carries a wiper RSW that co-operates with the contacts RS1 to RS7. The arm RSA is driven by the car A and is positioned in accordance with the level of the car A. When the car A is in the zone of the first floor the wiper RSW will touch the contacts RS1. When the car A is in the zone of the second floor the wiper RSW will touch the contacts RS2 and so on. The contacts RS1 to RS7 are respectively connected through coils KR1 to KR7 to the wires W23. The coils KR1 to KR7 control associated contacts KR11, KR21, KR31 . . . KR71; KR12, KR22, KR32 . . . KR72; KR23, KR33 . . . KR73 and KR14, KR24 . . . KR64. One contact of each of the pairs KR11 to KR71 is connected to the wire W21. The other contacts of these pairs are respectively connected through position indicator lamps PI1 to PI7 to the wire W23. The lamps PI1 to PI7 are located in a position indicator box PIB that is located in the associated car. Position indicator boxes PIB may additionally be provided at one or more of the floors adjacent the appropriate car entrance and in this case there would be additional lamps in parallel with the lamps PI1 to PI7 and their associated contacts KR11 to KR71. It will be appreciated that when the car is, for example, at the fourth floor, the wiper RSW will touch the contacts RS4 and the coil KR4 will be energised whereby the contacts KR41 will be closed and the lamp PI4 illuminated thereby indicating that the associated car is in the zone of the fourth floor.

A wire W24 is connected to the wire W21 through contacts COA9 which are open when the system is on automatic operation and closed when the system is on attendant operation. The wire W24 is connected through contacts LSR6, B18, C115 and SELA3 to one side of a load signal lamp LSL located in the associated car, the other side of this lamp being connected to the wire W23. The contacts B18 and C115 are respectively operated by the selector coils B1 and C1. The contacts SELA3 are closed only when the car A is at the despatching floor. One contact of the pair UIA2 is connected to the wire W24 and the other contact is connected to the wire W23 through an up direction lamp UDL located in the car. One contact of the pair DIA2 is connected to the wire W24 and the other is connected to the wire W23 through a down direction lamp DDL located in the associated car. One contact of each of the pairs UIA3 and DIA3 is connected to the wire W24 and the other contacts of these pairs are connected together and through contacts LUA5 and LDA5 and a buzzer BZZ to the wire W23, the buzzer BZZ being located in the associated car. The lamps LSL, UDL and DDL and the buzzer BZZ are for giving indications and warnings to the attendant. Consequently, when the system is on automatic operation, operation of these lamps and the buzzer is not required. Hence, when the coil COA is de-energised (for automatic operation), the contacts COA9 are opened and these lamps and the buzzer cannot be energised. When on attendant operation the contacts COA9 are closed. When the car is at the despatching floor and is the first selected car the contacts SELA3 are closed and neither of the contacts B18 and C115 are open so that the lamp LSL is illuminated, indicating to the attendant that he can take on passengers. When the car A is selected for upward travel and its interval has expired the contacts UIA2 and UIA3 close if there is an outstanding landing call. When a car call is registered contacts UIA2 and UIA3 close immediately the car call is registered irrespective of whether the interval has expired. Closure of the contacts UIA2 causes the illumination of the lamp UDL, and closure of contacts UIA3 operates the buzzer BZZ. Similarly, if there is a basement landing call and the car A is selected for downward travel and its interval has expired the coil DIA is energised and the contacts DIA2 and DIA3 close. When a car call is registered contacts DIA2 and DIA3 close immediately. Closure of the contacts DIA2 causes illumination of the lamp DDL to indicate that the car is about to move downwardly and closure of the contacts DIA3 operates the buzzer BZZ. The contacts LUA5, LDA5 are only closed when the car is at a despatching floor or when the car is about to change direction. Hence the buzzer BZZ is operated when the car is about to move away from the despatching floor or when the car is about to change over from an upward to a downward direction or vice versa.

The primary winding of the transformer T2 is connected in parallel with the primary winding of a transformer T3, the secondary of which has one end thereof connected to a wire W25 and the other end connected to a wire W26. The transformer T3 serves for energising a direction indicator circuit. A wire W27 is joined to the wire W26 through contacts LRA5. These contacts close when the car A is stopping or is stationary and hence the direction indicator circuit can only be energised when the car A is in this condition. One contact of each of the pairs KR34, KR44, KR54 and KR64 is connected to the wire W25. The other contacts of these pairs are respectively connected through direction indicator lamps DILU3, DILU4, DILU5 and DILU6, to one contact of the pair LUA4, the other contact of the pair LUA4 being connected to the wire W27. One contact of each of the pairs KR23, KR33, KR43, KR53 and KR63 is connected to the wire W25. The other contacts of these pairs are connected respectively through direction indicator lamps DILD2, DILD3, DILD4, DILD5 and DILD6 to one contact of the pair LDA4, the other of which is connected to the wire W27. One contact of the pair KR14 is connected to the wire W25 and the other contact is connected through a direction indicator lamp DILU1 to the wire W27. Energisation of the coil KR1 closes the contacts KR14 when the car is at the first floor and hence the lamp DILU1 is illuminated to indicate that the car is about to travel upwardly. The contacts LUA4 are closed when the car is on an upward trip and for a short period of time after the car has finished an upward trip and is about to descend. This period of time is determined by the predetermined delay of the coil TBU. The contacts LDA4 are closed when the car is on a downward trip and remain closed for a short period of time at the completion of a downward trip. This short period of time is determined by the delay of the coil TBD. When the car A is, for example, at the fourth floor the contacts KR43 and KR44 will be closed and hence the lamps DILD4 and DILU4 will be placed in a condition for operation. If the car is travelling upwardly the contacts LUA4 will be closed whereas the contacts LDA4 will be open. Hence, the lamp DILD4 cannot be illuminated, whereas the lamp DILU4 will be illuminated provided the car stops at the fourth floor, i. e. provided the contacts LRA5 close. Illumination of the lamp DILU4 indicates that the car that has stopped at the fourth floor is set for moving away in the upward direction. Had the car been travelling downwardly when it stopped at the fourth floor the lamp DILD4 could have been illuminated thereby to indicate that the car was set for moving away from the fourth floor in the downward direction.

One contact of the pair KR24 is connected to the wire W25 and the other contact is connected to a junction point JP32. This junction point is connected through contacts SELA1, LSR4, B19, C113 and GR4 to a junction point JP33. The contacts GR4 are controlled by a relay coil GR in the door operating circuit. The coil GR is energised to cause the car doors to close and de-energised to cause the doors to open. The contacts GR4 are closed when the coil GR is unenergised. The contacts SELA1 are closed when the car A is at the lower despatching floor and the contacts B19 or C113 are respectively opened when car B or C is the first selected car. The junction points JP32 and JP33 are additionally connected through contacts DSR9. The point JP33 is joined through an up direction indicating lamp DILU2 and contacts LDA5 to the wire W27.

One contact of the pair KR73 is connected to the wire W25 and the other is connected to a junction point JP34. The junction point JP34 is connected through contacts SELA2, LSR5, B110, C114 and GR5 to a junction point JP35. The contacts GR5 are controlled by the coil GR, being closed when the coil is unenergised, the contacts SELA2 are closed when the car A is at the upper despatching floor and the contacts B110 and C114 are respectively controlled by the selector coils B1 and C1. The junction points JP34 and JP35 are additionally connected to each other through contacts DSR11. The point JP35 is connected through a down direction indicating lamp DILD7 and contacts LUA5 to the wire W27. When the lift system is on upward despatch the contacts DSR9 are open and the contacts DSR11 closed. The contacts LUA5 are open when the car A is travelling upwardly and for a short period of time after the car has stopped travelling upwardly. When the car A is at the 7th floor the contacts KR73 are closed and at the expiry of this period of time the lamp DILD7 becomes illuminated to indicate that the car A is about to descend from the 7th floor. As regards the lamp DILU2 this will be illuminated when the car A is standing at the 2nd floor and is the first selected car (i. e. neither car B nor car C is first selected so that contacts B19 and C113 are closed) provided the car doors are not closing or closed (contacts GR4 remaining closed) and provided the load switch LS has not closed to cause the contacts LSR4 to open. If the lift system is operating on downward despatch the contacts DSR9 are closed and the contacts DSR11 are open. The lamp DILD7 then operates similarly to the way in which the lamp DILU2 operates when on upward despatch, and the lamp DILU2 operates similarly to the way in which the lamp DILD7 operates when on upward despatch. The lamp DILU1 is located adjacent the 1st floor entrance to car A, the lamps DILD2 and DILU2 are located adjacent the 2nd floor entrance to car A, and so on.

One contact of each of the pairs KR12 to KR72 is connected to the wire W20. The other contacts of these pairs are respectively connected through lift approach gongs LAG1 to LAG7 to a wire W28 which latter is connected through contacts HSR to the wire W22. The gongs LAG1 to LAG7 are respectively located at the first to seventh floors, and adjacent the entrances to their associated cars. When the car A is about to stop at a floor the associated gong is energised to direct the attention of an intending passenger at the landing to the landing doors which are about to open. The contacts KR12 to KR72 are closed when the car A is in the zone of the 1st to 7th floors respectively. Whether or not a gong will be energised as the car approaches a floor is determined by the contacts HSR. The contacts HSR are closed when a coil (not shown) in the motor circuit is energised to cause the car to slow down from high speed to slow speed. Thus when the car A is switched from high speed operation to cause it to stop the contacts HSR close and the appropriate one of the gongs will be energised.

*Door operation*

The door operating circuits for the three cars are identical and therefore only that appropriate to car A will be described.

One side of a door closing relay coil DCRA is connected to the line L2 (Figure 3B) and the other side of the coil is connected to a junction point JP22 which is joined through a door close push-button switch DCSW to the line L1. The relay coil DCRA controls contacts DCRA1 (Figure 3B) and DCRA2, DCRA3 and DCRA4 (Figure 6) and DCRA5 (Figure 2B). The point JP22 is also connected through the normally open contacts DCRA1, normally closed contacts SB1 and a normally closed door open push-button switch DOSW to the line L1. The contacts SB1 are controlled by a relay coil (not shown) that is energised when the brake controlling the car A is off. The switches DCSW and DOSW are located in the car A. Each car has its own doors (not shown) and at each landing there are landing doors (not shown) for each car. Door operating gear (not shown) driven by an electric motor (only the windings M1, M2 and M3 of which are shown), carried by each car simultaneously opens and closes the car doors and the landing doors associated with that car at the particular landing at which the car is located. The windings M1, M2, M3 are star connected, one end of each winding being connected to a common point CP. The other end of the winding M3 is connected through a fuse F5 to a terminal S33 of a three-phase supply. The other end of the winding M2 is connected through contacts OP1 and a fuse F6 to a terminal S32 of the three-phase supply, and is also connected through contacts CL1 and a fuse F7 to the terminal S31 of the three-phase supply. The other end of the winding M1 is connected through contacts CL2 and the fuse F6 to the terminal S32 and also through contacts OP2 and the fuse F7 to the terminal S31. Contacts OP1 and OP2 are controlled by a door-opening relay coil OP which also controls contacts OP3 to OP7. The contacts CL1 and CL2 are controlled by a door-closing relay coil CL which also controls contacts CL3 to CL6.

A terminal S+ is connected to one side of a D. C. supply and a terminal S— is connected to the other side of this supply. A wire W29 is connected to the terminal S+ and a wire W30 to the terminal S—. One side of the coil OP is connected to the wire W30 and the other side is connected through contacts GR1, a normally closed key operated switch KSW1, and door open limit contacts DLO to a junction point JP36, which latter is connected through a normally closed maintenance switch MSW and contacts PLS1 to the wire W29. The contacts PLS1 are operated by a relay coil that is energised only when the car A is being driven at high speed whereby the contacts PLS1 are then open. One end of the coil CL is connected to the wire W30 and the other end is connected through contacts GR2 and door close limit contacts DLC to the point JP36. A normally open key operated switch KSW2 is connected in series with contacts KSWC, across the contacts GR2. The switch KSW2 is ganged with the switch KSW1. The contacts KSWC close when the car A is at the lower despatching floor (2nd floor). One side of the door-operating relay GR is connected to the wire W30. The other side of this coil is connected through contacts OP3 to a junction point JP37 which latter is joined to the wire W29 through contacts LRA6. These contacts are controlled by the same coil that controls the contacts LRA1 and LRA3 to LRA5. The contacts LRA6 are arranged to be open when the car is stopping or is stationary and to be closed when the car is being driven. The point JP37 is also joined through contacts TRS3 to a point JP38. The point JP38 is connected through one of six channels to a point JP39 which is joined through contacts LSS to the wire W29. The contacts TRS3 are controlled by the time reversing relay coil TRS. The contacts LSS are controlled by a relay coil in the circuit of the motor that drives the car A, the coil being arranged to be energised to open the contacts LSS when the motor is on low speed operation. It is to be understood that the coil LSS always becomes energised when the car is being slowed-down from high speed operation. The first of the six channels contains normally open contacts UAA1 which are controlled by the attendant when the system is on attendant operation. When the attendant closes the push-button switch UAA to drive the car away upwardly the contacts UAA1 are closed. The second channel consists of normally open contacts DAA1 which are also controlled by the attendant when the system is on attendant operation. The contacts DAA1 are closed when the attendant closes the push-button switch DAA to drive the car away downwardly. The third, fourth, fifth and sixth channels have series connected contacts CL3 and GR3 common thereto. Contacts COA10 controlled by the switch C/O for selecting automatic or attendant operation are connected across the series connected contacts CL3 and GR3. The contacts GR3 are controlled by the door-operating relay coil GR as also are the contacts GR1, GR2, GR4 and GR5. The third channel includes contacts A112, the fourth channel includes contacts AR5, the fifth channel includes contacts DCRA2 and the sixth channel includes contacts A411.

One side of the time reversing relay coil TRS that controls contacts TRS1, TRS2, TRS3 (Figure 6) and TRS4 and TRS5 (Figure 3A) is connected to the wire W30, the other side of this coil being connected to a junction point JP40. A capacitance C in series with a resistance R2 are connected across the coil TRS. This capacitance circuit in parallel with the coil TRS causes, upon interruption of the circuit supplying the coil TRS, a delay in the operation of the contacts TRS1 to TRS5. Four circuits are connected in parallel with a condenser C for shorting-out the time delay effect of this condenser. These four parallel circuits consist respectively of normally open contacts A410, normally open contacts DCRA4, the normally open push-button switch UAA and the normally open push-button switch DAA, there being contacts SB2 and a resistance R3 common to all four parallel circuits. The contacts SB2 are operated by the coil that controls the brake in the circuit of the motor that operates the car A. When the brake is off the contacts SB2 are open and vice versa.

The junction point JP40 is joined to the wire W29 by nine parallel channels. The first channel consists of normally closed contacts CHA10 and normally open contacts DORA2. The contacts CHA10 are opened when the car A is at the despatching floor and the contacts DORA2 close when the coil DORA (Figure 2A) is energised. The second channel consists of the push-button operated door opening switch DOSW, which switch also appears in Figure 3. The third channel consists of normally open contacts PER which are controlled by a coil (not shown) that is energised by an amplification circuit of a photo-electric cell. A beam of light is directed across the landing entrance at which the car is located and this beam impinges upon the photo-electric cell. The coil is arranged to close the contacts PER when the beam is interrupted as by a person about to enter (or leave) the car. The fourth channel consists of normally open contacts RR1 which are controlled by a reversing switch (not shown) that is operated by a movable leading edge on the car door. If the car door whilst closing encounters an obstruction, for example, a person entering or leaving the car, the reversing switch is closed whereby the contacts RR1 close. The fifth channel consists of normally open contacts OP7 controlled by the door opening relay OP. The sixth channel consists of contacts LUA3 in series with contacts URA7. The seventh channel consists of contacts LDA3 in series with contacts DRA7. The eighth channel consists of contacts CON3 in series with contacts DORA1 which are respectively controlled by the coils CON and DORA (Figure 2A). The ninth channel consists of series connected contacts A111, CHA6, DCRA3, AR4, A49, UAA3 and DAA3. One end of a wire W31 is connected to a point between the contacts CON3 and DORA1 in the eighth channel and the other end of this wire is connected to a point in the ninth channel between the contacts A111 and CHA6.

One side of a time dynamic braking relay coil TDB is connected to the wire W30 and the other side of this coil is connected to the wire W29 through parallel connected contacts CL4 and OP4. The coil TDB controls contacts TDB1 which are connected in series with a dynamic braking relay coil DB, between the wires W29 and W30. The coil TDB closes its associated contacts TDB1 immediately upon energisation thereof but opens these contacts a predetermined period after the supply to the coil has been interrupted. The relay coil DB controls contacts DB1 and DB2. One contact of the pair DB1 is connected to said other end of the winding M1 and the other contact of the pair is connected through a variable resistance VR1 and series connected contacts CL5 and OP5 to the wire W29. One contact of the pair DB2 is connected to said other end of the winding M2 and the other contact of this pair is connected through series connected contacts CL6 and OP6 to the wire W30. One side of a time door closing buzzer relay coil TSX that controls contacts TSX1 is connected to the wire W30 and the other side of this coil is connected through the contacts TRS1 to the wire W29. The coil TSX is of the kind that operates its contacts immediately upon energisation but delays operation of its contacts upon de-energisation. One contact of the pair TSX1 is connected to the wire W29 and the other is connected through contacts TRS2 and a door closing buzzer DCB to the wire W30.

Overall control of the movement of the doors is exercised by the door operating relay GR. Provided the switches KSW1 and KSW2 are not moved from the position shown in Figure 6, energisation of the coil GR causes the doors to close and de-energisation of the coil GR causes the doors to open. This comes about as follows. When the car is in motion the contacts PLS1 will be open and neither of the coils OP and CL will be energised. The doors will be closed and hence the contacts DLC will be open. The contacts LRA6 will be closed as will the contacts OP3 and hence the coil GR will be energised. Thus the contacts GR1 will be open and the contacts GR2 and GR3 will be closed. As the car is slowed down to stop at a landing the contacts LRA6 open, the contacts PLS1 close, and the contacts LSS open. Opening of the contacts LRA6 and LSS de-energises the relay GR and hence the contacts GR1 close and the contacts GR2 open. Closing of the contacts GR1 completes the circuit through the relay coil OP which therefore becomes energised and closes contacts OP1, OP2, OP4 and OP7 and opens the contacts OP3, OP5 and OP6. Closing of the contacts OP1 and OP2 causes the windings M1, M2 and M3 to become energised and hence the door operating motor is set in motion to open the doors. Closure of the contacts OP4 energises the relay TDB whereby the contacts TDB1 close to energise the coil DB. Energisation of the coil DB closes the contacts DB1 and DB2. As the doors complete their opening movement they operate the contacts DLO whereby the circuit through the coil OP is interrupted and the coil becomes de-energised. The contacts OP1, OP2, OP4 and OP7 consequently open and the contacts OP3, OP5 and OP6 close. Opening of the contacts OP1, OP2 de-energises the windings M1 and M2 and hence the motor stops driving the doors. Closure of the contacts OP5 and OP6 causes a direct current to be fed to the windings M1 and M2 thereby to exert a braking effect upon the rotor of the door operating motor. The contacts TDB1 open a predetermined period of time after the opening of the contacts OP4 and hence the contacts DB1 and DB2 remain closed for a period of time after the closing of the contacts OP5 and OP6. At the expiry of this period of time the contacts DB1 and DB2 open whereby the supply of direct current to the windings M1 and M2 ceases. Whilst the doors are opening and the door opening relay OP is energised, the contacts OP3 are open and hence the coil GR cannot be energised. Energisation of the coil OP has closed the contacts OP7 and hence the coil TRS is energised to close the contacts TRS1. This energises the coil TSX and hence the contacts TSX1 are closed. Energisation of the coil TRS also opens the contacts TRS3. Thus, when the coil OP is de-energised and the contacts OP3 close, the coil GR cannot be re-energised until such time as the contacts TRS3 close. Whilst the car is stationary at a landing, the contacts LSS are closed and hence closure of the contacts TRS3 energises the coil GR provided one of the six channels between the contacts LSS and TRS3 is completed. Energisation of the coil GR opens the contacts GR1 and closes the contacts GR2 and GR3. Closure of the contacts GR2 causes energisation of the coil CL whereby the contacts CL1, CL2 and CL4 close and the contacts CL3, CL5 and CL6 open. Closure of the contacts CL1 and CL2 causes energisation of the windings M1, M2 and M3 and hence the door operating motor is set in motion. When the contacts OP1 and OP2 are closed the winding M1 is connected to the terminal S31 and the winding M2 is connected to the terminal S32. When the contacts CL1 and CL2 close, however, the winding M1 is connected to the terminal S32 and the winding M2 is connected to the terminal S31. Hence, the windings of the motor are energized upon closure of the contacts CL1 and CL2, in a direction rotationally opposite to that in which they are energised when the contacts OP1 and OP2 are closed. Thus, the door operating motor closes the doors when the coil CL is energised. As the doors close the contacts DLC are opened and hence the coil CL is deenergised so that the windings M1 and M2 are disconnected from the terminals S32 and S31. Closure of the contacts CL4 energises the coil TDB whereby the contacts TDB1 close to energise the coil DB. The coil DB closes the contacts DB1 and DB2 and these contacts remain closed for a period of time after opening of the contacts CL4. Hence, as with the door opening operation direct current is injected into the windings M1 and M2 to effect a braking influence upon the rotor of the door operating motor. After the time delay determined by the coil TDB has expired, the contacts DB1 and DB2 open whereby the direct current supply to the windings M1 and M2 is interrupted.

As previously mentioned, whilst the car is stationary, the coil GR cannot be energised until the contacts TRS3 close. These contacts close a predetermined period of time after interruption of the circuit through the coil TRS which controls the contacts TRS1. The time delay is determined by the coils TRS. When the contacts TRS3 and TRS2 close and TRS1 open there is a period of time when the contacts TSX1 and TRS2 are closed, due to the time delay on the coil TSX, so that the buzzer DCB is energised to give warning of door closure. The operation of the buzzer terminates when the contacts TSX1 open.

As just mentioned, closure of the contacts TRS3 can only occur a predetermined period of time after interruption of the circuit through the coil TRS. The delay of the coil TRS is a loading delay provided to give time for the car to be loaded and/or unloaded. The delay of the coil TSX is a buzzer delay and is equal to the period of time for which the buzzer DCB sounds upon door closure. If the coil TRS is re-energized during its own delay period closure of the contacts TRS3 is delayed for another complete interval of loading delay after re-interruption of the circuit through the coil TRS. Hence completion during the loading delay of one of the nine circuits between the junction point JP40 and the wire W29 causes a postponement in the closing of the doors. Furthermore, if the doors are closing or are closed (i. e. the coil GR is energised) completion of one of these nine circuits (provided the car is stationary) causes the doors immediately to open since opening of the contacts TRS3 occurs immediately upon energisation of the coil TRS, it being understood that when the doors are closing or are closed the contacts DLO are closed.

A channel between the wire W29 and the junction point JP40 is closed to energise the coil TRS and cause closed doors to open—

(1) When the car is a free car standing idle at a floor other than the despatching floor and an intending passenger at the floor where the free car is presses a landing button thus causing closure of the contacts DORA2;

(2) When the door opening push-button DOSW inside the car is depressed;

(3) When the contacts OP7 are closed as the car arrives at a floor at which a stop is to be made;

(4) With the car at the despatching floor (contacts CHA6 closed), when the car becomes the first selected car (i. e. when contacts A111 close), provided the despatch interval has not expired (contacts AR4 and A49 closed);

(5) With the car at the despatching floor and being the first selected car (contacts A111 closed), when a landing call is made from the despatching floor (contacts ODRA1 close), such opening being irrespective of whether the system is on upward or downward despatch, or (6) With the system on night service (contacts CON3 closed), when a landing call is made from the 2nd floor provided the car is at this floor (contacts DORA1 close).

If the doors are open for loading at the lower despatching floor, interruption of the circuit through the coil TRS occurs to initiate door closing (provided one of the six channels between the points JP38 and JP39 is closed) (A) at the expiry of the despatch interval (i. e. when the contacts AR4 open) or (B) when the coil A4 becomes energised through the closure of the contacts TRLA upon operation of the load switch LS (since in this case contacts A49 open) or (C) when the door close switch DCSW is operated (contacts DCRA3 open) or (D) when either of the switches UAA or DAA is closed whilst the system is on attendant operation (UAA3 or DAA3 open). If the car is at any other floor closure of the doors is ordinarily initiated by the opening of the contacts OP7. The closing of the doors may, however, be delayed after closure of the contacts OP7 beyond the loading delay (1) by closure of the contacts PER during the loading delay (2) by simultaneous closure of the contacts LUA3 and URA7 during the loading delay or (3) by simultaneous closure of the contacts LDA3 and DRA7 during the loading delay. The contacts PER are closed if the light beam in front of the open doors is interrupted by a person entering (or leaving) the car. When the person moves out of the beam the contacts PER will open and the door closing will be initiated by such opening. If the car will depart from a floor in the opposite direction to that in which it arrived at the floor, there will be a period whilst the contacts LUA3 remain closed at the same time as the contacts URA7 or whilst the contacts LDA3 remain closed at the same time as the contacts DRA7 are closed. This is so since it will be recollected that the coils LUA and LDA become deenergised a predetermined period of time after deenergisation of the coils URA and DRA respectively. Hence, when the car is about to reverse the doors remain open for a period of time that is longer than that determined solely by operation of the contacts OP7, since the delay of the coils LUA and LDA is greater than the time for which contacts OP7 remain closed. The longer delay at reversal is required because when the car arrives at a floor, initially that direction lamp at the floor is illuminated that indicates the direction in which the car has just been travelling. This lamp remains illuminated and the car electric motor circuit remains in a condition permitting continued motion in the same direction until the coil LUA or LDA as the case may be becomes deenergised whereupon the motor circuit becomes set to drive the car in the opposite direction and the other direction lamp at that floor becomes illuminated. Such setting of the motor circuit is required in case a landing call occurs which the car could deal with by continued motion in its arrival direction and which call occurs at about the time the car arrives at the floor. It is to be noted that the period of time for which a car ordinarily remains at a floor at which it reverses (not being the despatching floor) is longer than the normal despatch interval at floors at which it does not reverse.

If the doors are closing and the leading edge of a door encounters an obstruction, such as a person entering or leaving the car, the contacts RR1 are closed and the coil TRS is energised whereby the contacts TRS3 are opened to deenergise the coil GR and open the doors.

The loading delay period can be reduced by shorting out the condenser C. In this case the closure of the doors commences immediately after interruption of the circuit through coil TRS. Shorting of the condenser C occurs (a) when the despatch signal is given to the car A by energisation of the coil A4 since the contacts A410 will close, or (b) by operation of the door closing relay coil DCRA as by a passenger entering the car and pressing the push-button for closing the doors since in this case the contacts DCRA4 will close, or (c) by operation (upon attendant operation) of either of the push-buttons UAA or DAA.

As mentioned above, closure of the contacts TRS3 energises the coil GR if the car is stationary and provided one of the channels between the contacts LSS and TRS3 is closed. A channel becomes closed if the up or down attendant buttons in the car are operated when the system is on attendant operation since in this case the contacts UAA1 or DAA1 will be closed. No other channels can be closed on attendant operation since the contacts COA10 are open and the contacts GR3 cannot close until the coil GR is energised to close the doors. If the system is not on attendant operation, the contacts COA10 will become closed and a channel is completed (i) upon expiry of the despatch interval (contacts AR5 close), or (ii) upon operation of the door closing relay in the car (contacts DCRA2 close) or (iii) upon the occurrence of a despatch signal (contacts A411 close). Whilst the system is on automatic operation and the car A is the first selected car awaiting expiry of its despatch interval there is no closed circuit (unless the car receives a despatch signal or the door closing switch DCSW is operated) between the points JP38 and JP39, since the contacts A112 will be open.

Thus on automatic operation the cars stand at the despatching floor with doors closed except the first selected car during its despatch interval. On attendant operation the cars stand at the despatching floor with the doors open.

Whilst the doors are closing the coils GR and CL are energised and hence the contacts GR3 are closed and the contacts CL3 are open. For attendant operation the switch UAA or DAA must be maintained closed whilst the doors are closing since otherwise both sets of contacts UAA1 and DAA1 will be open and as the contacts CL3 and COA10 are open no channel between the contacts LSS and TRS3 is completed to maintain the coil GR in an energised condition. At the conclusion of a door closing operation the contacts DLC open and de-energise the relay coil CL whereby the contacts CL3 close. The coil GR therefore remains energised whilst the car is stationary, through the contacts A112, GR3, CL3, TRS3 and OP3. Should the coil TRS become energised whilst the car remains stationary, irrespective of whether the system is on automatic or attendant operation, the contacts TRS3 will be opened and the coil GR de-energised to cause opening of the doors. If, however, the doors are shut and the car is being driven energisation of the coil TRS does not effect de-energisation of the coil GR since in this case a circuit is completed through this coil via the contacts LRA6 which bridge the contacts LSS and TRS3. Thus the doors cannot be driven to the open position until the speed of the car is reduced to said slow speed.

*Maintenance*

The maintenance switches MSA, MSB, MSC (Figure 2A) are ordinarily in the position shown and the lift system operates as described above. When one of the switches, say the switch MSA, is operated so that the pole MSA1 is joined to the pole MSA2 the coils MR1A, MR2A and MR3A are energised. This has the effect of disconnecting the car A from the despatcher so that the car A has no effect thereon and the car A can be operated only by its car call push-buttons 1 to 7. Opening of the contacts MR3A1, MR3A2 and MR3A3 prevents the car A from cancelling landing calls, opening of the contacts MR1A1 (Figure 3A) and MR2A2 (Figure 7) prevents landing calls from being registered for the car A, opening of the contacts MR3A4 and MR3A5 (Figure 2B) prevents selection of the car A, and closure of the contacts MR1A5 (Figure 2C) prevents activities of the car A from blocking operation of the service call relay coil SCR. Closure of the contacts MR1A8 (Figure 2C) and opening of the contacts MR3A6 and MR3A7 (Figure 2C) prevent the car A from affecting the duration of the despatch interval. The opening of the contacts MR2A1 renders the indicator system of Figure 5 for the car A ineffective. Opening of the contacts MR2A3 (Figure 3A) prevents energisation of the auto-return coil ARA. The car A door system continues to operate normally.

If two switches, say, MSB and MSC are positioned to energise the coils MR1B, MR2B, MR3B and MR1C, MR2C and MR3C, the car A operates as though on a simple collective system with no despatch interval, since there is a permanent closed circuit between the point JP23 and the wire W11 via the contacts MR1B2 and MR1C3. Basement calls are dealt with in the same way as any other landing calls, as the contacts MR1B11 and MR1C12 are closed.

When one of the switches, say, MSA, is positioned so that the pole MSA1 is connected to the pole MSA3 the coil MRXA is energised and the contacts MRXA2 close whereby the coils MR1A, MR2A and MR3A are energised to produce the effects described above. In addition, the contacts MRXA1 connected across the switch C/O and the contacts CON2 close, whereby the coil COA is energised irrespective of whether the system is on night service (contacts CON2 open) or on automatic operation (switch C/O open). That is to say, the circuitry of the car A is switched as for attendant operation. The coil MRXA also closes contacts (not shown) in the motor circuit of the car A that ensure that the car A can only be driven at a lower than normal speed and only when continuous pressure is maintained on the appropriate push-button UAA ("up" movement) or DAA ("down" movement).

*Call re-registration*

The system described above may if desired be modified to include the call re-registration means shown in Figures 8 to 10. When a car stops to attend to a down landing call the attendant may find that he is unable to take on all the passengers waiting at this floor and who desire to do down and he is therefore provided with means in the car for re-registering a down landing call for this floor. The down landing call originally registered for this floor by an intending passenger at the landing will, of course, have been cancelled by arrival of the car at the floor.

One side of a call re-registration push-button switch RB in the car is connected to the line L1 and the other side is connected through contacts U and D and a call re-registration relay coil RCR to the line L2. The coil RCR controls contacts RCR1 to RCR3. The contacts U open when the car is being driven upwardly and the contacts D open when the car is being driven downwardly. The contacts RCR1 are connected in series with contacts HS which open when the car is switched to high speed operation. Series-connected contacts HS and RCR1 are connected across series-connected switch RB and contacts U and D. The contacts RCR3 are connected in the landing call cancelling circuitry of Figure 2A. The contacts are not shown in Figure 2A, the position in which they are connected when the call re-registration means is employed being indicated in Figure 9. The contacts RCR3 are connected between the contacts LUA1 and the junction point JP1A. Contacts similar to RCR3 and appropriate to cars B and C are connected between the contacts LUB1 and the junction point JP1B and between the contacts LUC1 and the junction point JP1C.

One contact of the pair RCR2 is connected to the line ML and the other contact of this pair is connected to a wire WR. The wire WR is connected to the points S2D to S6D through contacts SR2 to SR6 respectively. The contacts SR2 to SR6 are operated by the car A to be closed when the car is at the appropriate floor, i. e. the contacts SR2 close when the car is at the second floor, the contacts SR3 close when the car is at the third floor and so on. The point S2D is connected to that side of the switch operated by the button 2D that is connected to the coil L2D. The point S3D is connected to that side of the switch operated by the button 3D that is connected to the coil L3D. The points S4D to S6D are similarly connected to the switches associated with the buttons 4D to 6D.

When a downwardly travelling car arrives at, say, the fourth floor as a result of a down landing call at the fourth floor the coil L4D will be de-energised through the cancelling circuit line ML, wire W2, contacts L4D1, said other winding of the coil L4D, contacts SL4DA, wire W5, contacts MR3A2, contacts LUA1, contacts RCR3, contacts LRA1, contacts COA1, or FRA1, contacts TPA1, contacts MR3A3, and line EL. If the attendant finds that he cannot take on all the passengers at the fourth floor, he presses the button RB and as the car is stationary contacts U and D are closed so that the coil RCR is energised. Such energisation closes contacts RCR1 and RCR2 and opens contacts RCR3. Closure of contacts RCR1 holds the coil RCR in the energised condition since at this time the contacts HS are closed. Opening of the contacts RCR3 opens the cancelling circuit just enumerated and which was closed by the arrival of the car at the floor. Closure of the contacts RCR2 re-energises the coil L4D through the circuit line ML, contacts RCR2, contacts SR4, resistance R, said one coil of the winding L4D, wire W1 and line EL. When the car leaves the floor the contacts SL4DA open so that the cancelling circuit cannot be completed and when the car reaches high speed the contacts HS open to deenergise the coil RCR thereby to restore the contacts RCR1 to RCR3 to their initial condition. Operation of the switch RB whilst the car is travelling cannot energise the coil RCR since either the contacts U or D will be open.

*Miscellaneous*

The electric motors that drive the three cars are each energised by a motor generator set (not shown). When the lift system is in operation on attendant control, the motor generator sets are continuously in operation and the field windings of the electric motors are continuously energised whereby the coils that operate the contacts FRA1 to FRA3, FRB1 to FRB3 and FRC1 to FRC3 are energised. Operation of the changeover switch C/O to place the system on automatic operation, however, causes the motor generator sets to be automatically shut down when not required. The motor generator set of a car is started when the car is selected for despatch providing there is a service call in registration and the despatch interval has expired or if the despatch floor landing button is pressed. The appropriate set is also started if the second selected car is required to attend to a basement call. The set is shut down when the car is returned to the despatching floor and after the expiration of a delay period providing no further call for service remains for that car. It is because of this shut down feature of the motor generator sets that contacts operated by the field winding coils are always to be found in parallel with contacts operated by the changeover switch C/O of the relevant car.

I claim:

1. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device of the first selected car when the despatch interval has expired and there is an outstanding landing call that requires despatch of a car, and means transferring starting preference from the selected car to the next selected car at the despatching floor at the same time as the despatch signal device of the first selected car is operated.

2. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device for the first selected car when the despatch interval has expired and there is an outstanding landing call that requires despatch of a car, means transferring starting preference from the first selected car to the next selected car at the despatching floor at the same time as the despatch signal device of the first selected car is operated, and means initiating the despatch interval of the next selected car at the despatching floor at the same time as starting preference is transferred to the next selected car.

3. A despatching and control system for a plurality of cars serving a number of floors including a despatching floor, the system comprising means in the cars for registering car calls, means at the floor for registering landing calls, means for returning the cars to the despatching floor on completion of their trips, means for selecting the order of despatch of the cars from the despatching floor in accordance with the order of arrival of the cars at the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device of the first selected car when the despatch interval has expired and there is an outstanding landing call that requires despatch of a car, means for transferring starting preference from the first selected car to the next selected car at the despatching floor when the despatch signal device of the first selected car is operated, means for initiating the despatch interval of the next selected car at the despatching floor when the starting preference is transferred to the next selected car, means for ensuring that in the event that there is no next selected car at the despatching floor the despatch intervals of all the cars commence when the last remaining car at the despatching floor leaves the despatching floor, and means upon return of the first car to the despatching floor for wiping out the effect of commencement of the despatch intervals of the other cars.

4. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device for the first selected car when the despatch interval has expired and there is an outstanding landing call that requires despatch of a car, means for transferring starting preference from the first selected car to the next selected car at the despatching floor when the despatch signal device of the first selected car is operated, means for initiating the despatch interval of the next selected car at the despatching floor when starting preference is transferred to the next selected car, and means for preventing the despatch interval of each car from commencing whilst another car is the first selected car.

5. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device of the first selected car when the depatch interval has expired and there is an outstanding landing call that requires despatch of a car, means for transferring starting preference from the first selected car to the next selected car at the despatching floor when the despatch signal device of the first selected car is operated, and means for restoring an operated despatch signal device to its unoperated condition in the event that the associated car has failed to start when the despatch signal device of the next selected car is operated.

6. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device of the first selected car when the despatch interval has expired and there is an outstanding landing call that requires despatch of a car, means for transferring starting preference from the first selected car to the next selected car at the despatching floor when the despatch signal device of the first selected car is operated, means for transferring starting preference to the next selected car in the event that the first selected car is despatched from the despatching floor prior to the expiry of the despatch interval for this car, and means for restoring the despatch signal device of each car to the unoperated condition when the associated car leaves the despatching floor.

7. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device for the first selected car when the despatch interval has expired and there is an outstanding landing call that requires despatch of a car, and means for varying the despatch intervals of the cars in accordance with the positions of the cars.

8. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device for the first selected car when the despatch interval has expired and there is an outstanding landing call that requires despatch of a car, means for selecting the direction of travel of each car, and means for varying the despatch intervals of the cars in accordance with the selected direction of travel of the cars.

9. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device for the first selected car when the despatch interval has expired and there is an outstanding landing call that requires despatch of a car, and means for shortening the despatch interval of the first selected car when every car away from the despatching floor is above a certain floor.

10. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device for the first selected car when the despatch interval has expired and there is an outstanding landing call that requires despatch of a car, and means for shortening the despatch interval of the first selected car when every car away from the despatching floor is travelling downwardly.

11. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device for the first selected car when the despatch interval has expired and there is an outstanding landing call that requires despatch of a car, and means for shortening the despatch interval of the first selected car provided there is not a previously selected car still at the despatching floor on which the despatch signal device is operated.

12. A despatching and control system for a plurality of cars serving a number of floors including a despatching floor, the system comprising means for selecting the order of despatch of the cars from the despatching floor, means for selecting the direction of travel of the cars, timing means for providing a despatch interval, a despatch signal device for each car operable when the associated car is the car first selected for despatch and following expiry of the despatch interval for the car, and means for shortening the despatch interval when every car away from the despatching floor is travelling downwardly.

13. A despatching and control system for a plurality of cars serving a number of floors including a despatching floor, the system comprising means for selecting the order of despatch of the cars from the despatching floor, means for selecting the direction of travel of each car, timing means for providing a despatch interval, a despatch signal device for each car operable when the associated car is the car first selected for despatch and following expiry of the despatch interval for the car, and means for shortening the despatch interval provided there is no car set for travelling upwardly and which is below a certain floor and provided there is no car standing at the despatching floor with its despatch signal device operated.

14. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, means for setting the direction of travel of the cars, timing means for providing a despatch interval for delaying despatch from the despatching floor of the car first selected for despatch, a despatch signal device for each car for initiating, when operated, despatch of the associated car from the despatching floor, means for operating the despatch signal device for the first selected car when the despatch interval has expired and there is an outstanding landing call that requires despatch of a car, means for transferring starting preference from the first selected car to the next selected car at the despatching floor when the despatch signal device of the first selected car is operated, means for initiating the despatch interval of the next selected car at the despatching floor when starting preference is transferred to the next selected car, and means for shortening the despatch interval provided there is no car set for travelling upwardly and which is below a certain floor and provided there is no car standing at the despatching floor with its despatch signal device operated.

15. A despatching and control system for a plurality of cars serving a number of floors including an upper floor that can be a despatching floor and a lower floor that can be a despatching floor, the system comprising switch means having three operative positions in one of which said upper floor is selected as the despatching floor, in the second of which said lower floor is selected as the despatching floor and in the third of which one of said upper floor and said lower floor is selected as the despatching floor, means for returning the cars to the floor selected as the despatching floor on completion of their trips, means for selecting the order of despatch of the cars from the despatching floor, timing means for providing a despatch interval, a despatch signal device for each car for initiating despatch of the associated car and operable when the associated car is the first selected car and following expiry of the despatch interval, and means shortening the despatch interval when the switch means is in said first and second positions.

16. A despatching and control system for a plurality of cars serving a number of floors including an upper floor than can be a despatching floor and a lower floor that can be a despatching floor, the system comprising switch means having three operative positions in one of which said upper floor is selected as the despatching floor, in the second of which said lower floor is selected as the despatching floor and in the third of which one of said upper floor and said lower floor is selected as the despatching floor, means for returning the cars to the floor selected as the despatching floor on completion of their trips, means for selecting the order of despatch of the cars from the despatching floor, means for setting the directions of travel of the cars, timing means for providing a despatch interval, a despatch signal device for each car for initiating despatch of the associated car and operable when the associated car is the first selected car and following expiry of the despatch interval, means shortening the despatch interval when the switch means is in said first and second positions, and means varying the despatch interval when the switch means is in said third position, in accordance with the positions and directions of travel of the cars.

17. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device for the first selected car when the despatch interval has expired and there is an outstanding landing call that requires despatch of a car, a load sensitive device for each car operable when the load in the car exceeds a predetermined amount, and means causing the load sensitive device when operated to operate the despatch signal device of the associated car for despatching this car from the despatching floor irrespective of whether the despatch interval for the car has expired.

18. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device for the first selected car when the despatch interval has expired and there is an outstanding landing call that requires despatch of a car, a load sensitive device for each car operable when the load in the associated car exceeds a predetermined amount, and means for causing when each load sensitive device is operated, operation of the despatch signal device of the associated car for despatching this car from the despatching floor irrespective of whether the car is the first selected car or not.

19. A despatching and control system for a plurality of cars serving a number of floors including a despatching floor, the system comprising means in the cars for registering car calls, means at the floors for registering landing calls, means for returning the cars to the despatching floor on completion of a trip, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device for the first selected car when the despatch interval has expired and there is an outstanding landing call that requires despatch of a car, a load sensitive device for each car operable when the load in the car exceeds a predetermined amount, means causing the load sensitive device when operated to operate the despatch signal device of the associated car for despatching this car from the despatching floor irrespective of whether the despatch interval for the car has expired, floor lanterns at the despatching floor one for each car, means for illuminating the floor lantern of a car when it is the first selected car upon which the despatch interval has not expired, and means for extinguishing the floor lantern when the load sensitive device of the associated car is operated.

20. A despatching and control system for a plurality of cars serving a number of floors including a despatching floor, the system comprising landing call registration means common to all the cars, car call registration mechanism for each car, means associated with each car for selection of the direction of travel of the car in accordance with the landing calls outstanding and the car calls registered in that car, means for selecting the order of despatch of the cars for the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device of the first selected car when the despatch interval has expired and there is an outstanding landing call that requires despatch of a car, and means for preventing landing calls from affecting the direction selection means of a car at the despatching floor until the despatch signal device of this car has been operated.

21. A despatching and control system for a plurality of cars serving a number of floors including a despatching floor, the system comprising landing call registration means common to all the cars, car call registration mechanism for each car, means associated with each car for selection of the direction of travel of the car in accordance with the landing calls outstanding and the car calls registered in that car, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device of the first selected car when the despatch interval has expired and there is an outstanding landing call that requires despatch of a car, and means for ensuring that car calls have priority over landing calls as regards setting the direction selection means whilst each car is at the despatching floor.

22. A despatching and control system for a plurality of cars serving a number of floors including a despatching floor, the system comprising means in the cars for registering car calls, means at the floors for registering landing calls, means for despatching the cars from the despatching floor, means for returning the cars to the despatching floor, and means for operating the returning means of each car when the car has served the outstanding call therefor most remote from the despatching floor provided less than all of the other cars have had the returning means thereof operated whereby if all the other cars have had their returning means operated the remaining car becomes a free car that is not automatically returned to the despatching floor.

23. A despatching and control system for a plurality of cars serving a number of floors including a despatching floor, the system comprising means in the cars for registering car calls, means at the floors for registering landing calls, means for despatching the cars from the despatching floor, means for returning the cars to the despatching floor, means for operating the returning means of a car when the car has served the outstanding call therefor most remote from the despatching floor provided less than all of the other cars have had the returning means thereof operated whereby if all the other cars have had their returning means operated said car becomes a free car that is not automatically returned to the despatching floor, and further means for operating the returning means of the free car when a landing call is made at a floor between the free car and the despatching floor for a direction away from the despatching floor, the last-mentioned call initiating despatch of another car at the despatching floor.

24. A despatching and control system for a plurality of cars serving a number of floors including a despatching floor, the system comprising means in the cars for registering car calls, means at the floors for registering landing calls, means for despatching the cars from the despatching floor, means for returning the cars to the despatching floor, means for operating the returning means of each car when the latter has served the outstanding call therefor most remote from the despatching floor provided less than all of the other cars have had the returning means thereof operated whereby if all the other cars have had their returning means operated the remaining car becomes a free car that is not automatically returned to the despatching floor, and switch means which when rendered effective serves for causing operation of the returning means whenever the associated car is despatched from the despatching floor.

25. A despatching and control system for a plurality of cars serving a number of floors including a despatching floor, the system comprising means in the cars for registering car calls, means at the floors for registering landing calls, means for despatching the cars from the despatching floor, means for returning to the despatching floor all the cars except the last car to remain in operation whereby the last car becomes a free car that remains at the floor to which it is last called, means for selection of the direction of travel of each car in accordance with calls that are registered, car doors for each car, means for opening and means for closing the doors of each car, means operating the closing means of the free car after it has attended to its last outstanding call whereby the free car stands with its doors closed, means operated by that means for registering landing calls that is at the floor where the free car is for causing operation of the opening means, and means that prevents operation of those means for registering landing calls that are at floors other than where the free car is from affecting the direction selection means until the expiry of a predetermined time after the doors of the free car have opened.

26. A despatching and control system for a plurality of cars serving a despatching floor, a number of floors above the despatching floor and a basement below the despatching floor, the system comprising means in the cars for registering car calls, means at the floors for registering landing calls, means at the basement for registering a call for the basement, means for selecting the order of despatch of the cars from the despatching floor in accordance with the order of their arrival at the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device of the first selected car when the despatch interval has expired and there is an outstanding landing call that requires despatch of a car, and means for despatching the first selected car to the basement to attend to a call made at the basement provided the despatch interval of the first selected car has expired.

27. A despatching and control system for a plurality of cars serving a despatching floor, a number of floors above the despatching floor and a basement below the despatching floor, the system comprising means in the cars for registering car calls, means at the floors and the basement for registering landing calls, means for selecting the order of despatch of the cars from the despatching floor in accordance with the order of their arrival at the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device of the first selected car when the despatch interval has expired and there is an outstanding landing call that requires despatch of a car, and means for despatching the second selected car to the basement to attend to a landing call made at the basement provided the despatch interval has not expired on the first selected car.

28. A despatching and control system for a plurality of cars serving a despatching floor, a number of floors above the despatching floor and a basement below the despatching floor, the system comprising means in the cars for registering car calls, means at the floors and the basement for registering landing calls, means for selecting the order of despatch of the cars from the despatching floor in accordance with the order of their arrival at the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device of the first selected car when the despatch interval has expired and there is an outstanding landing call that requires despatch of a car, means for enabling a basement landing call to be served by the second selected car provided the despatch interval has not expired on the first selected car, and means enabling a basement landing call to be served by a car returning downwardly to the despatching floor.

29. A despatching and control system for a plurality of cars serving a despatching floor, a number of floors above the despatching floor and a basement below the despatching floor, the system comprising means in the cars for registering car calls, means at the floors and the basement for registering landing calls, means for selecting the order of despatch of the cars from the despatching floor in accordance with their order of arrival at the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device of the first selected car when the despatch interval has expired and there is an outstanding landing call that requires despatch of a car, means for enabling a basement landing call to be served by the second selected car provided the despatch interval has not expired on the first selected car, means enabling a basement landing call to be served by a car returning downwardly to the despatching floor, a down floor lantern for each car at the despatching floor, and means for illuminating the down floor lantern of each car for a pre-set time after arrival of the associated car downwardly to the despatching floor.

30. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device of the first selected car when the despatch interval has expired and there is an outsanding landing call that requires despatch of a car, car doors for each car, means for opening and means for closing the doors of each car, and means for causing the doors of all cars at the despatching floor to remain closed except the doors of a first selected car upon which the despatch interval has not expired.

31. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device of the first selected car when the despatch interval has expired and there is an outstanding landing call that requires despatch of a car, car doors for each car, means for opening and means for closing the doors of each car, means for causing the doors of all cars at the despatching floor to remain closed except the doors of a first selected car upon which the despatch interval has not expired, and means for causing a landing call made at the despatching floor to open the doors of the first selected car upon which the despatch interval has expired, for a period of time at the conclusion of which the doors close.

32. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, timing means for providing a despatch interval for delaying despatch from the despatching floor of the car first selected for despatch, a despatch signal device for each car for initiating, when operated, despatch of the associated car from the despatching floor, means for operating the despatch signal device of the first selected car when the despatch interval has expired and there is an outstanding landing call that requires despatch of a car, car doors for each car, means for opening and means for closing the doors of each car, means for causing the doors of all cars at the despatching floor to remain closed except the doors of a first selected car upon which the despatch interval has not expired, and means for each car operable by the despatch signal device of the car when it is the first selected car to cause closure of the doors of this car.

33. A despatching and control system for a plurality of cars serving a number of floors including a despatching floor, the system comprising means for despatching the cars from the despatching floor, means at the floors for registering landing calls for each direction of travel, means for returning the cars to the despatching floor on completion of their trips, means for cancelling a registered landing call when a car travelling in the appropriate direction stops at the floor for which the landing call is registered, and means operable from inside the car whilst the car is stopped at the floor for re-registering a landing call for the floor and for neutralising the cancelling means whilst the car remains at the floor.

34. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, means for despatching the cars in response to calls, driving mechanism for each car and each such mechanism including a motor generator set, means for starting the motor generator set of each car when the car becomes the first selected car provided there is an outstanding call necessitating despatch of the car, means for shutting down the motor generator set of each car after the associated car has returned to the despatching floor, and means ensuring a time delay between arrival of each car at the despatching floor and shut-down of the associated motor generator set.

35. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, a despatch signal device for each car for initiating, when operated, despatch of the associated car from the despatching floor, service call means serving when energised for placing the despatch signal device of the car first selected for despatch from the despatching floor in a condition for operation, car circuits associated one with each car, a landing call circuit that is closed only when there is an outstanding landing call from a floor other than the despatching floor, electrical connections connecting the service call means, the car circuits and the landing call circuit together in series, and means in each car circuit for closing a path through the car circuit when the associated car is unable to attend to the outstanding landing call.

36. A system as claimed in claim 35, wherein each car circuit has a path that is closed when the associated car is at the despatching floor.

37. A despatching and control system as claimed in claim 35, wherein each car circuit has a path that is closed when a call is made at a landing that is between the car and the despatching floor, the call being for a direction away from the despatching floor.

38. A despatching and control system as claimed in claim 35, wherein each car circuit has a completed path if whilst there is an outstanding landing call the associated car is delayed at a floor other than the despatching floor for more than a predetermined time.

39. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, a despatch signal device for each car for initiating, when operated, despatch of the associated car from the despatching floor, service call means serving when energised for placing the despatch signal device of the car first selected for despatch from the despatching floor in a condition for operation, car circuits associated one with each car, a landing call circuit that is closed only when there is an outstanding landing call from a floor other than the despatching floor, electrical connections connecting the service call means, the car circuits and the landing call circuit together in series, means for setting the direction of travel of each car, and means in each car circuit forming a closed path through the circuit when a landing call occurs for the direction in which the car is set to travel and the call is at a floor that is behind the car having regard to its set direction of travel.

40. A despatching and control system for a plurality of cars serving a number of floors including a despatching floor, the system comprising means in the cars for registering car calls, means at the floors for registering landing calls, means for returning the cars to the despatching floor on completion of their trips, means for selecting the order of despatch of the cars from the despatching floor, a despatch signal device for each car for initiating, when operated, despatch of the associated car from the despatching floor, service call means serving when energised for placing the despatch signal device of the car first selected for despatch from the despatching floor in a condition for operation, car circuits associated one with each car, a landing call circuit that is closed only when there is an outstanding landing call from a floor other than the despatching floor, electrical connections connecting the service call means, the car circuits and the landing call circuit together in series, means for setting the direction of travel of each car, and means in each car circuit for forming a completed path through the car circuit when the associated car is set for travel towards the despatching floor and a landing call occurs for the opposite direction of travel.

41. A despatching and control system for a plurality of cars serving a despatching floor, a number of floors above the despatching floor and a basement below the despatching floor, the system comprising means in the cars for registering car calls, means at the floors and the basement for registering landing calls, means for despatching the cars from the despatching floor to serve calls registered for said floors, such despatching means including means for selecting the order of such despatch of the cars from the despatching floor, timing means for providing a despatch interval for delaying despatch from the despatching floor of the car first selected for despatch, and means upon occurrence of a basement landing call for initiating despatch to the basement of the car selected as second for despatch if the despatch interval for the car first selected for despatch has not expired but if it has expired for initiating despatch to the basement of the first selected car provided this car has not been signalled for despatch to serve calls registered for any of said floors.

42. A despatching and control system for a plurality of cars serving a despatching floor, a number of floors above the despatching floor and a basement below the despatching floor, the system comprising means in the cars for registering car calls, means at the floors and the basement for registering landing calls, means for despatching the cars from the despatching floor to serve calls registered for said floors, such despatching means including means for selecting the order of such despatch of the cars from the despatching floor, timing means for providing a despatch interval for delaying despatch from the despatching floor of the car first selected for despatch, and means upon occurrence of a basement landing call for causing, if there is one, a downward travelling car to serve the basement, such means otherwise serving for initiating despatch to the basement of the car selected as second for despatch if the despatch interval of the car first selected for despatch has not expired, but if it has expired such means initiating despatch of the first selected car to the basement provided this car has not been signalled for despatch to serve calls registered for any of said floors.

References Cited in the file of this patent

UNITED STATES PATENTS

| | | |
|---|---|---|
| 2,682,318 | Glaser et al. | June 29, 1954 |
| 2,740,495 | Santini et al. | Apr. 3, 1956 |
| 2,746,566 | Thurston | May 22, 1956 |